US012598377B2

(12) United States Patent
Sato et al.

(10) Patent No.: US 12,598,377 B2
(45) Date of Patent: Apr. 7, 2026

(54) IMAGING DEVICE, IMAGING CONTROL DEVICE, AND CONTROL METHOD OF IMAGING DEVICE FOR SWITCHING BETWEEN SETTINGS FOR IMAGING

(71) Applicant: SONY GROUP CORPORATION, Tokyo (JP)

(72) Inventors: Mayuko Sato, Tokyo (JP); Sumino Sato, Tokyo (JP); Fumikazu Hatanaka, Tokyo (JP); Eri Yoshihara, Tokyo (JP); Ryoko Terajima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 122 days.

(21) Appl. No.: 18/001,105

(22) PCT Filed: Jan. 25, 2021

(86) PCT No.: PCT/JP2021/002503
§ 371 (c)(1),
(2) Date: Dec. 8, 2022

(87) PCT Pub. No.: WO2021/255975
PCT Pub. Date: Dec. 23, 2021

(65) Prior Publication Data
US 2023/0217105 A1 Jul. 6, 2023

(30) Foreign Application Priority Data

Jun. 17, 2020 (JP) ................................. 2020-104852

(51) Int. Cl.
*H04N 23/667* (2023.01)
*G03B 17/02* (2021.01)
(Continued)

(52) U.S. Cl.
CPC .......... *H04N 23/667* (2023.01); *G03B 17/02* (2013.01); *H04N 23/50* (2023.01); *H04N 23/62* (2023.01);
(Continued)

(58) Field of Classification Search
None
See application file for complete search history.

(56) References Cited

U.S. PATENT DOCUMENTS 7,649,563 B2 * 1/2010 Lee ...................... H04N 23/632
348/333.02
10,542,215 B2 * 1/2020 Kunishige ............ H04N 23/617
(Continued)

FOREIGN PATENT DOCUMENTS

JP 2003-259161 A 9/2003
JP 2007-264049 A 10/2007
(Continued)

OTHER PUBLICATIONS

International Search Report and Written Opinion of PCT Application No. PCT/JP2021/002503, issued on Apr. 20, 2021, 13 pages of ISRWO.

*Primary Examiner* — Quan Pham
(74) *Attorney, Agent, or Firm* — CHIP LAW GROUP

(57) ABSTRACT

An imaging device includes a control unit that performs first switching processing of switching between a first setting used for imaging in a moving state and a second setting used for imaging in a non-moving state, and second switching processing of alternately switching between a first predetermined F-number for increasing a depth of field and a second predetermined F-number for decreasing the depth of field with respect to an F-number.

18 Claims, 19 Drawing Sheets

PLAN VIEW

1

FRONT VIEW        SIDE VIEW        REAR VIEW

(51) Int. Cl.
    *H04N 23/50*           (2023.01)
    *H04N 23/62*           (2023.01)
    *H04N 23/63*           (2023.01)
    *H04N 23/67*           (2023.01)
    *H04N 23/68*           (2023.01)

(52) U.S. Cl.
    CPC ......... *H04N 23/631* (2023.01); *H04N 23/633*
        (2023.01); *H04N 23/635* (2023.01); *H04N*
        *23/675* (2023.01); *H04N 23/6811* (2023.01)

(56)         References Cited

U.S. PATENT DOCUMENTS

2011/0115966 A1*  5/2011  Ueda ........................ G02B 7/36
                                    348/E5.045
2013/0044229 A1*  2/2013  Noguchi ............. H04N 23/667
                                    348/E5.078

2015/0256728 A1*  9/2015  Kosaka ................ H04N 23/667
                                     348/374
2017/0078550 A1*  3/2017  Terasawa ................ H04N 23/73
2018/0063436 A1*  3/2018  Miyazawa ......... H04N 23/6815
2018/0183993 A1*  6/2018  Kobayashi .......... G06F 3/04883
2021/0329158 A1* 10/2021  Ichikawa .............. H04N 23/62
2021/0368062 A1* 11/2021  Hirai .................... H04N 23/65

FOREIGN PATENT DOCUMENTS

| | | | |
|---|---|---|---|
| JP | 2007-300221 | A | 11/2007 |
| JP | 2015-089060 | A | 5/2015 |
| JP | 2018-033013 | A | 3/2018 |
| WO | 2015/045144 | A1 | 4/2015 |
| WO | 2015/151386 | A1 | 10/2015 |

* cited by examiner

Figure 1:
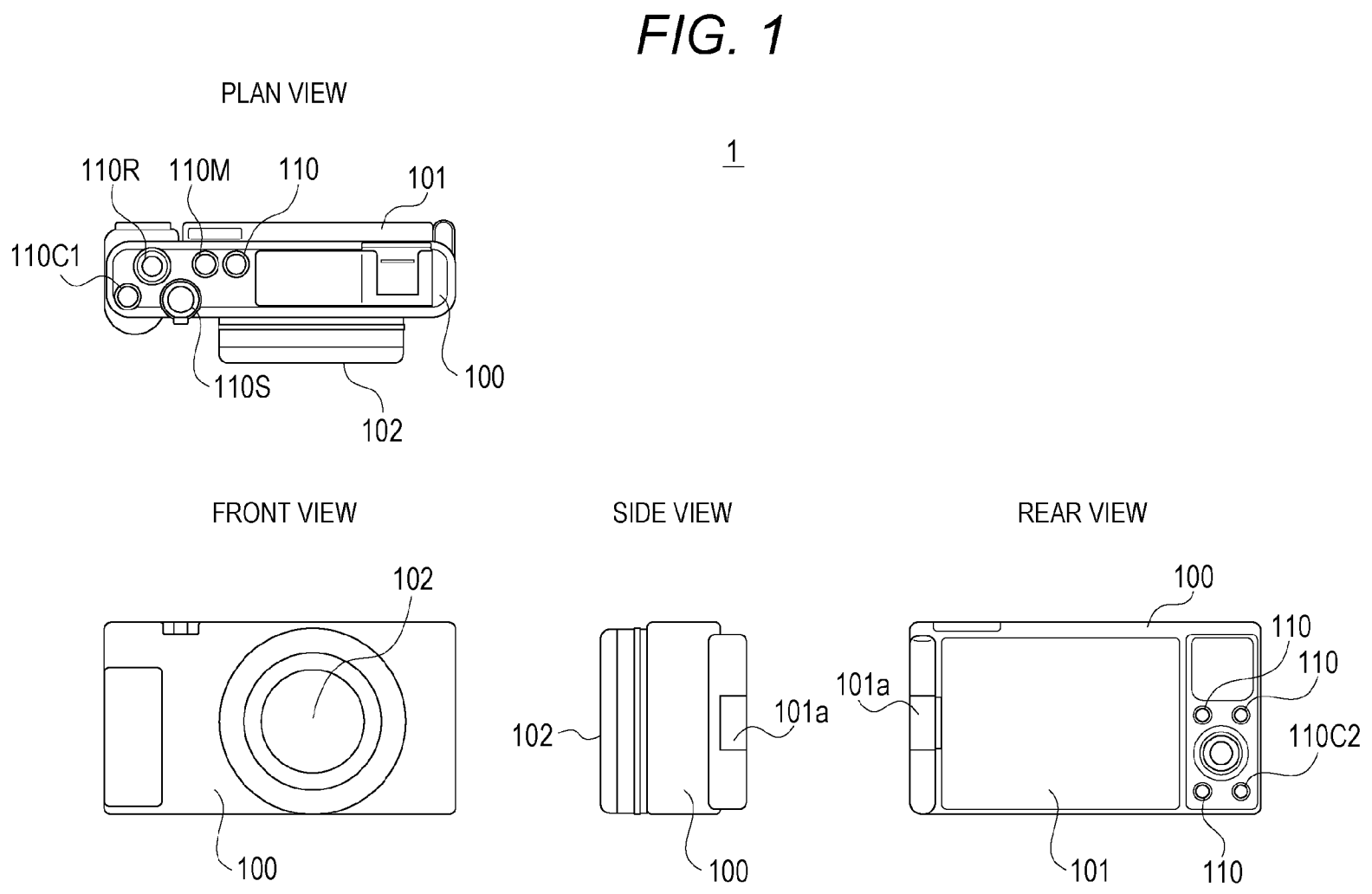

PLAN VIEW

101

110

110M

110R

110C1

110S

102

100

REAR VIEW

110

110

110C2

110

100

101

101a

101a

SIDE VIEW

101a

100

102

FRONT VIEW

MENU SCREEN

| 📷1 | 📷2 | 🌐 | 🧰 | ★ |

SETUP 3                    ◄3/7►

CLEANING MODE
TOUCH MANIPULATION                              ON
TOUCH SENSITIVITY                        STANDARD
TOUCH PANEL/TOUCHPAD   TOUCH PANEL+TOUCHPAD
TOUCHPAD SETTING
DEMO MODE                                       OFF

■■■■■■■■■■■■        ■ ↩

FUNCTION MENU

50

60

60

1/30　　　F2.8　　　ISO AUTO

1/30　　　F2.8　　　ISO AUTO

FIG. 8B

TOGGLE MODE

BLUR

SHARPEN

AUTO/SETTING VALUE

CUSTOM BUTTON

POWER OFF
Menu BUTTON
Mode BUTTON

53

58A

"SHARPEN"     "BLUR"

58A          58B

BACKGROUND BLUR: BLUR
WHEN PRESSING MODE BUTTON,
SWITCHING STATE OF BLUR OF
BACKGROUND WILL BE RELEASED

59

FIG. 11A
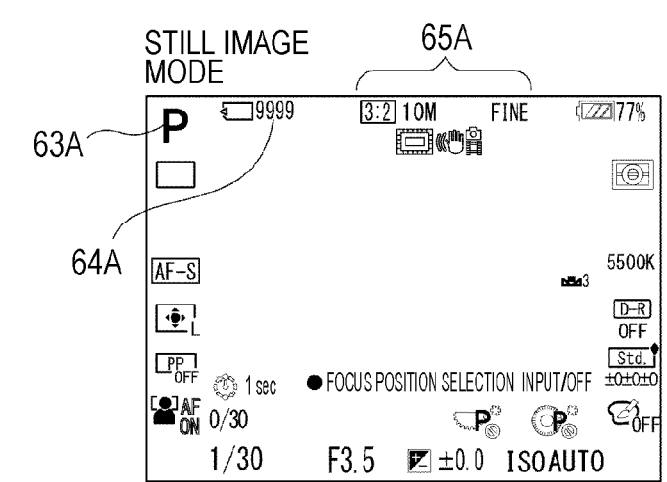
FIG. 11B
FIG. 11C
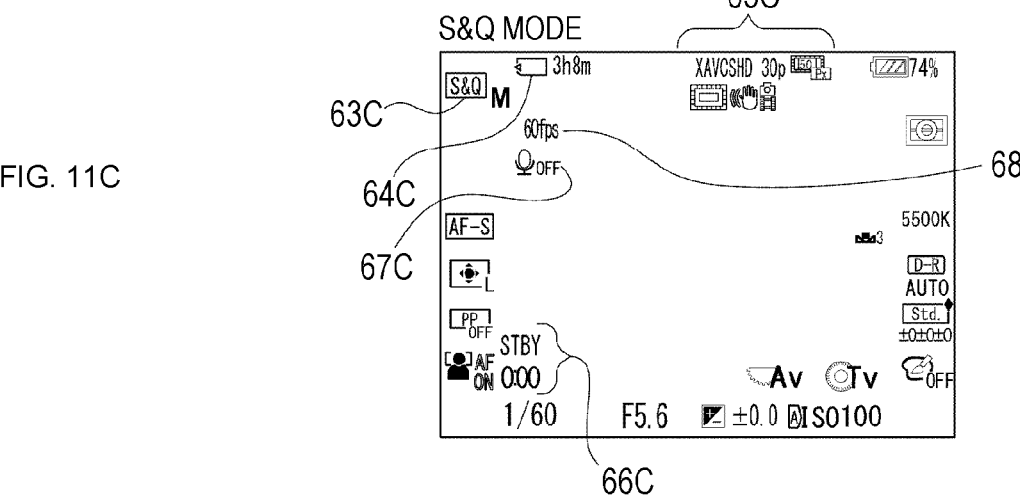

IN CASE OF 4X SLOW

68

69A

IN CASE OF 2X QUICK

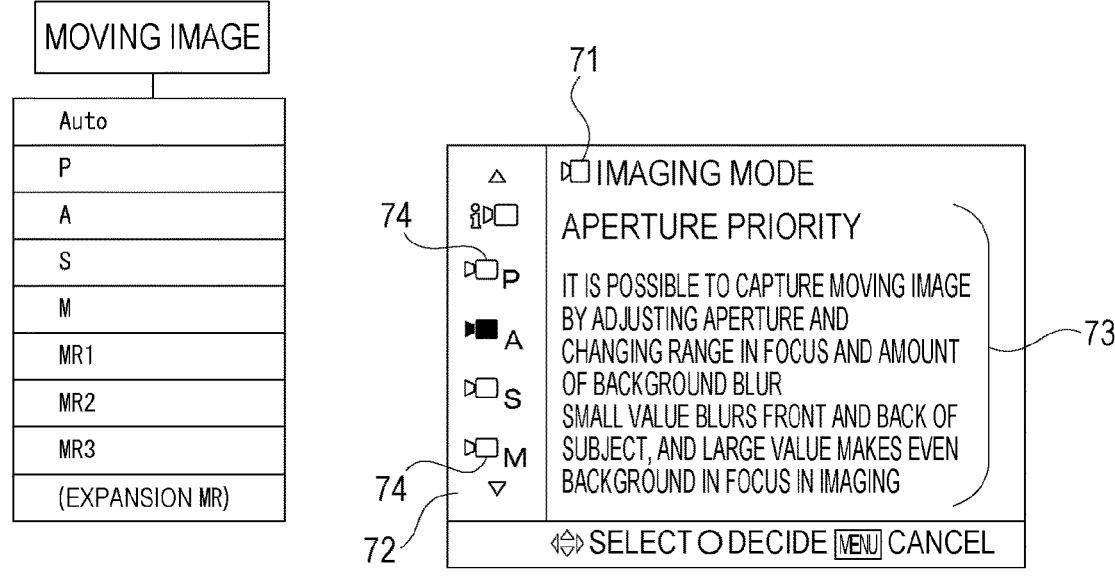

```
MOVING IMAGE
┌─────────────┐
│ Auto        │
│ P           │
│ A           │
│ S           │
│ M           │
│ MR1         │
│ MR2         │
│ MR3         │
│ (EXPANSION MR) │
└─────────────┘
```

71

△

74

⬚P

■ A

⬚S

74

⬚M

▽

72

⬚ IMAGING MODE

APERTURE PRIORITY

IT IS POSSIBLE TO CAPTURE MOVING IMAGE
BY ADJUSTING APERTURE AND
CHANGING RANGE IN FOCUS AND AMOUNT
OF BACKGROUND BLUR
SMALL VALUE BLURS FRONT AND BACK OF
SUBJECT, AND LARGE VALUE MAKES EVEN
BACKGROUND IN FOCUS IN IMAGING

73

◁⬦▷ SELECT ○ DECIDE [MENU] CANCEL

FIG. 17

| MODE CATEGORY | SETTING MODE | TOTAL |
|---|---|---|
| STILL IMAGE iAuto | iAuto / iAuto+ | 2 TYPES |
| STILL IMAGE PASM | P / A / S / M | 4 TYPES |
| PANORAMA | | 1 TYPE |
| SCN | 9 TYPES | 9 TYPES |
| MOVING IMAGE iAuto | iAuto | 1 TYPE |
| MOVING IMAGE PASM | P / A / S / M | 4 TYPES |
| S&Q PASM | P / A / S / M | 4 TYPES |
| MR | 1 / 2 /3 | 3 TYPES |

→ 28 TYPES

IMAGING DEVICE, IMAGING CONTROL DEVICE, AND CONTROL METHOD OF IMAGING DEVICE FOR SWITCHING BETWEEN SETTINGS FOR IMAGING

CROSS REFERENCE TO RELATED APPLICATIONS

This application is a U.S. National Phase of International Patent Application No. PCT/JP2021/002503 filed on Jan. 25, 2021, which claims priority benefit of Japanese Patent Application No. JP 2020-104852 filed in the Japan Patent Office on Jun. 17, 2020. Each of the above-referenced applications is hereby incorporated herein by reference in its entirety.

TECHNICAL FIELD

The present technology relates to an imaging device, an imaging control device, a control method of an imaging device, and a program, and relates to settings for imaging.

BACKGROUND ART

There is known a technology of performing processing relating to various types of imaging such as focus control on a moving image captured by an imaging device.

CITATION LIST

Patent Document

Patent Document 1: Japanese Patent Application Laid-Open No. 2018-33013

SUMMARY OF THE INVENTION

Problems to be Solved by the Invention

Meanwhile, recently, a user actively posts a moving image captured by the user himself/herself to a moving image posting site, a social networking service (SNS), or the like by an imaging device such as a digital video camera or a smartphone.

Under such an environment, the user himself/herself may capture an image while moving, or the user himself/herself may become a subject, and thus a function of an imaging device suitable for imaging in such a case is required.

Therefore, the present disclosure proposes a technology for further improving convenience of an imaging device.

Solutions to Problems

An imaging device according to the present technology includes a control unit that performs first switching processing of switching between a first setting used for imaging in a moving state and a second setting used for imaging in a non-moving state, and second switching processing of alternately switching between a first predetermined F-number for increasing a depth of field and a second predetermined F-number for decreasing the depth of field with respect to an F-number.

Furthermore, an imaging control device according to the present technology also includes such a control unit.

For example, it is possible to switch between a setting used in a moving state such as imaging while walking and a setting used in a non-moving state such as imaging while standing. Furthermore, it is possible to switch between a setting in which the depth of field is deep and a setting in which the depth of field is shallow.

In the imaging device according to the present technology described above, it is considered that the first setting is a setting that enables a setting of a priority target at a time of autofocus, and turns on camera shake correction, and the second setting is a setting that disables the setting of the priority target at the time of autofocus, and turns off the camera shake correction.

The setting of the priority target at the time of autofocus is a setting for performing focus control with, for example, a face as a priority target at the time of autofocus.

In the imaging device according to the present technology described above, it is considered that the control unit performs processing of switching between the first setting and the second setting in a toggle manner according to a manipulation, as the first switching processing.

Therefore, the setting used for imaging in the moving state and the setting used for imaging in the non-moving state are switched in a toggle manner according to the manipulation.

In the imaging device according to the present technology described above, it is considered that the control unit performs control processing of executing display presenting that the setting is the first setting or the second setting according to the first switching processing.

For example, the icon indicating that the first setting (or the second setting) is applied is displayed.

In the imaging device according to the present technology described above, it is considered that the control unit performs control processing of executing display presenting a guide frame indicating a visual field range at a time of moving image capturing, at a time of imaging standby for still image capturing in the second setting.

The angle of view at the time of still image capturing is different from the angle of view at the time of moving image capturing. Therefore, the visual field range at the time of moving image capturing is presented to call attention at the time of imaging standby for the still image capturing.

In the imaging device according to the present technology described above, it is considered that the second predetermined F-number is a value corresponding to aperture opening.

That is, switching to imaging with the shallowest depth of field is performed.

In the imaging device according to the present technology described above, it is considered that the control unit performs control to enter a toggle mode in which the first predetermined F-number and the second predetermined F-number are alternately switched as the second switching processing according to a specific manipulation.

That is, the setting in which the depth of field is deep and the setting in which the depth of field is shallow are switched in a toggle manner.

In the imaging device according to the present technology described above, it is considered that the control unit performs control processing of executing display presenting that the F-number is the first predetermined F-number or the second predetermined F-number.

For example, the icon indicating that the first predetermined F-number (or the second predetermined F-number) is applied is displayed.

In the imaging device according to the present technology described above, it is considered that a manipulation element for moving image capturing is provided on an upper surface of a main body housing, and the manipulation element has a larger manipulation surface size than other manipulation elements except a shutter manipulation element, which are arranged on the upper surface.

That is, the manipulation element for moving image capturing is made easier to manipulate than other manipulation elements except the shutter manipulation element.

In the imaging device according to the present technology described above, it is considered that the control unit performs third switching processing of switching a plurality of imaging modes including variable speed moving image recording.

For example, it is possible to switch between moving image capturing at 1× speed and moving image capturing at a speed which is not an equal speed, such as 2× speed.

In the imaging device according to the present technology described above, it is considered that the plurality of imaging modes includes a still image capturing mode, a first moving image capturing mode, and a second moving image capturing mode, a frame rate of the first moving image capturing mode is a reference frame rate, and a frame rate of the second moving image capturing mode is different from the reference frame rate.

That is, it is possible to switch between still image capturing, moving image capturing at the reference frame rate, and moving image capturing at a frame rate different from the reference frame rate.

In the imaging device according to the present technology described above, it is considered that the reference frame rate is a frame rate for 1× speed moving image recording, and the frame rate of the second moving image capturing mode is able to be set to be higher or lower than the reference frame rate.

That is, in the second moving image capturing mode, moving image capturing of slow motion or moving image capturing of quick motion as compared with 1× speed moving image capturing at the reference frame rate is executed.

In the imaging device according to the present technology described above, it is considered that the control unit performs processing of switching the plurality of imaging modes in a toggle manner according to a manipulation, as the third switching processing.

Therefore, the imaging mode is switched in a toggle manner according to the manipulation. Note that the switching in a toggle manner in this case means repeatedly switching a plurality of imaging modes in a predetermined order. That is, the switching in a toggle manner is not limited to the case of alternately switching two imaging modes, and includes, for example, a case of repeatedly switching three or more imaging modes provided as the plurality of imaging modes in a predetermined order.

In the imaging device according to the present technology described above, it is considered that a manipulation element for giving an instruction on the third switching processing is provided on an upper surface of the main body housing.

Therefore, the imaging mode is switched by the manipulation of the manipulation element provided on the upper surface of the main body housing of the imaging device.

In the imaging device according to the present technology described above, it is considered that, before completion of switching according to a manipulation of giving an instruction on the third switching processing, the control unit performs control processing of executing display presenting the imaging mode after completion of the switching according to the manipulation.

For example, the icon for providing notification of the imaging mode after completion of the switching is displayed.

A control method of an imaging device according to the present technology includes a procedure of switching between a first setting used for imaging in a moving state and a second setting used for imaging in a non-moving state; and a procedure of alternately switching between a first predetermined F-number for increasing a depth of field and a second predetermined F-number for decreasing the depth of field with respect to an F-number.

That is, the setting used in the moving state and the setting used in the non-moving state can be switched. Furthermore, it is possible to switch between a setting in which the depth of field is deep and a setting in which the depth of field is shallow.

A program according to the present technology is a program causing an arithmetic processing device to execute control processing of the control method.

Another imaging device according to the present technology includes a control unit that performs switching processing of switching between a first setting used for imaging in a moving state and a second setting used for imaging in a non-moving state.

That is, the setting used in the moving state and the setting used in the non-moving state can be switched.

Another imaging device according to the present technology includes a control unit that performs switching processing of alternately switching between a first predetermined F-number for increasing a depth of field and a second predetermined F-number for decreasing the depth of field with respect to an F-number.

That is, it is possible to switch between the setting in which the depth of field is deep and the setting in which the depth of field is shallow.

BRIEF DESCRIPTION OF DRAWINGS

FIG. 1 illustrates a plan view, a front view, a side view, and a rear view of an imaging device of an embodiment of the present technology.

FIG. 2 is a block diagram of an internal configuration of the imaging device of the embodiment.

FIGS. 8A and 8B are explanatory diagrams of switching of a depth of field of the embodiment.

FIGS. 11A, 11B, and 11C are explanatory diagrams of a display example regarding switching of an imaging mode of the embodiment.

FIGS. 15A and 15B are explanatory diagrams of another setting mode and a display example of a setting screen of the embodiment.

FIG. 17 is an explanatory diagram for describing executable imaging modes of the embodiment.

MODE FOR CARRYING OUT THE INVENTION

Figures 3A, 3B:
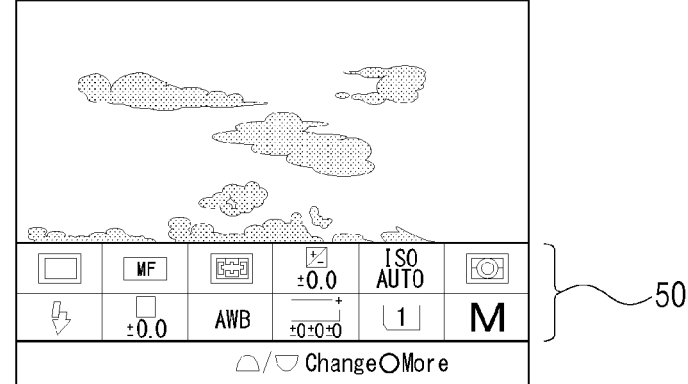
FIGS. 3A and 3B are explanatory diagrams of a menu screen and a function menu of the embodiment.

Hereinafter, embodiments will be described in the following order.

<1. Configuration of imaging device>
<2. Focus control according to main scene>
<3. Depth switching>
<4. Switching of imaging mode>
<5. Processing example>
<6. Summary and modification example>

1. Configuration of Imaging Device

FIG. 1 illustrates a plan view, a front view, a side view, and a rear view of an imaging device 1 of an embodiment.

The imaging device 1 is a so-called digital camera, and can execute both still image capturing and moving image capturing.

In the imaging device 1, a lens unit 102 is arranged on the front side of a main body housing 100 constituting a camera main body. At the time of imaging, a shutter on a front surface side is opened, and a lens for imaging is exposed.

On a rear surface side (user side) of the imaging device 1, for example, a display panel 101 by a display device such as a liquid crystal display (LCD) or an organic electro-luminescence (EL) display is provided.

In this example, the display panel 101 is held by a shaft portion 101*a* so as to be openable, closable, and rotatable. The drawing illustrates the display panel 101 in a state in which a display surface is not exposed.

The user can visually recognize an image at the time of imaging, an image at the time of reproduction, and various types of information by the display panel 101.

Various manipulation elements 110 are provided on the main body housing 100 of the imaging device 1.

For example, as the manipulation element 110, various forms such as a key, a dial, and a composite manipulation element for the press/rotation are provided to realize various manipulation functions. For example, a menu manipulation, a reproduction manipulation, a mode selection manipulation, a focus manipulation, a zoom manipulation, a selection manipulation of parameters such as a shutter speed and an F-number, and the like can be performed.

A detailed description of each manipulation element 110 is omitted, but in the present embodiment, some manipulation elements 110 including a shutter button 110S, a recording button 110R, and a mode button 110M are arranged on an upper surface side of the main body housing 100.

In this case, the recording button 110R is a relatively large button, and is easy to manipulate. For example, the recording button 110R has substantially the same size as the shutter button 110S.

For example, among the manipulation elements 110 provided on the upper surface side of the main body housing 100, the shutter button 110S is the largest, and the recording button 110R is the second largest. The opposite may be applied. Alternatively, the buttons may have the same size.

In any case, since the recording button 110R is a large-sized manipulation element on the upper surface side, the manipulation becomes easy, for example, in a case where a moving image poster places the imaging device 1 on a desk or the like to perform imaging, or in a case where the user holds the imaging device 1 toward himself/herself as a selfie.

As one of the manipulation elements 110, custom buttons 110C1 and 110C2 are illustrated. In this example, the custom button 110C1 is arranged on the upper surface of the main body housing 100, and the custom button 110C2 is arranged on the lower right of the rear surface of the main body housing 100.

The custom buttons 110C1 and 110C2 are manipulation elements also called an assignable button, and are buttons to which predetermined manipulation functions are assigned in an initial state and to which the user can assign an arbitrary manipulation function.

Note that the number of custom buttons is not limited to two, and one custom button or three or more custom buttons may be provided.

Figure 2:
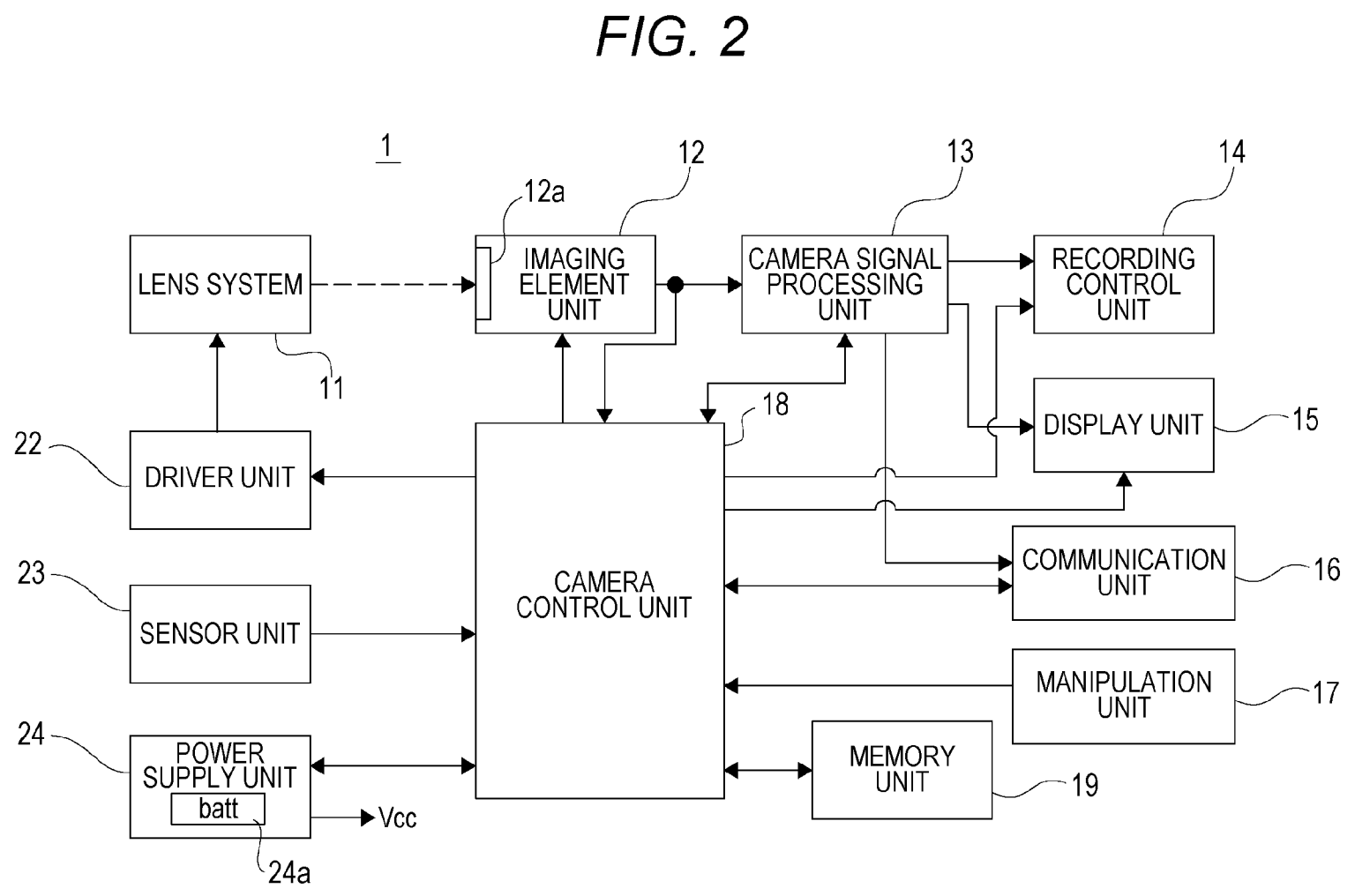

The configuration example of the imaging device 1 will be described with reference to FIG. 2.

The imaging device 1 includes, for example, a lens system 11, an imaging element unit 12, a camera signal processing unit 13, a recording control unit 14, a display unit 15, a communication unit 16, a manipulation unit 17, a camera control unit 18, a memory unit 19, a driver unit 22, a sensor unit 23, and a power supply unit 24.

The lens system 11 includes lenses such as a zoom lens and a focus lens, an aperture mechanism, and the like. Light (incident light) from a subject is guided by the lens system 11, and is condensed on the imaging element unit 12.

The imaging element unit 12 includes, for example, an image sensor 12*a* (imaging element) of a complementary metal oxide semiconductor (CMOS) type, a charge coupled device (CCD) type, or the like.

The imaging element unit 12 performs, for example, correlated double sampling (CDS) processing, automatic gain control (AGC) processing, and the like, and further performs analog/digital (A/D) conversion processing on electrical signals obtained by photoelectrically converting light received by the image sensor 12*a*. Then, imaging signals as digital data are output to the camera signal processing unit 13 and the camera control unit 18 in a subsequent stage.

The camera signal processing unit 13 is configured as an image processing processor by, for example, a digital signal processor (DSP) or the like. The camera signal processing unit 13 performs various types of signal processing on digital signals (captured image signals) from the imaging element unit 12. For example, as a camera process, the camera signal processing unit 13 performs preprocessing, synchronization processing, YC generation processing, resolution conversion processing, file formation processing, and the like.

In the preprocessing, clamp processing of clamping black levels of R, G, and B to a predetermined level, correction processing between color channels of R, G, and B, and the like are performed on the captured image signals from the imaging element unit 12.

In the synchronization processing, color separation processing is performed so that image data for each pixel has all the R, G, and B color components. For example, in the case of an imaging element using a Bayer array color filter, demosaic processing is performed as the color separation processing.

In the YC generation processing, a luminance (Y) signal and a color (C) signal are generated (separated) from the R, G, and B image data.

In the resolution conversion processing, the resolution conversion processing is executed on the image data subjected to various types of signal processing.

In the file formation processing, for example, compression encoding for recording or communication, formatting, generation or addition of metadata, and the like are performed on the image data subjected to, for example, the above-described various types of processing, and thereby a file for recording or communication is generated.

For example, an image file in a format such as JPEG, Tagged Image File Format (TIFF), or Graphics Interchange Format (GIF) is generated as a still image file. Furthermore, it is also conceivable to generate an image file as an MP4 format or the like used for recording moving images and audio conforming to MPEG-4.

Note that it is also conceivable to generate an image file as raw (RAW) image data.

The camera signal processing unit 13 generates metadata including information of processing parameters in the camera signal processing unit 13, various control parameters acquired from the camera control unit 18, information indicating an operation state of the lens system 11 or the imaging element unit 12, mode setting information, imaging environment information (date and time, place, and the like), identification information of the imaging device itself, information of a mounting lens, information of a previously registered camera operator (name and identification information), International Press Telecommunications Council (IPTC) metadata, and the like.

Note that the IPTC metadata is metadata in a format designed by a media company association, and can describe various types of information such as "description/caption", "description writer", "headline", and "keyword".

The recording control unit 14 performs recording and reproduction on a storage medium by a nonvolatile memory, for example. The recording control unit 14 performs processing of recording an image such as moving image data or still image data, or metadata on the storage medium, for example.

Various actual forms of the recording control unit 14 can be considered. For example, the recording control unit 14 may be configured as a flash memory built in the imaging device 1 and a write/read circuit thereof. Furthermore, the recording control unit 14 may be in a form of a card recording and reproduction unit that performs recording and reproduction access to the storage medium detachable from the imaging device 1, for example, a memory card (portable flash memory or the like). Furthermore, the recording control unit 14 may be realized as a hard disk drive (HDD) or the like as a form built in the imaging device 1.

The display unit 15 is a display unit that performs various kinds of display for a photographer, and is, for example, a display panel or a viewfinder by a display device such as a liquid crystal display (LCD) or an organic electro-luminescence (EL) display arranged on the housing of the imaging device 1.

The display unit 15 executes various types of display on a display screen on the basis of an instruction from the camera control unit 18.

For example, the display unit 15 displays a reproduction image of the image data read from the storage medium in the recording control unit 14.

Furthermore, there is a case where image data of a captured image of which the resolution has been converted for display by the camera signal processing unit 13 is supplied to the display unit 15, and the display unit 15 performs display on the basis of the image data of the captured image in response to the instruction from the camera control unit 18. Therefore, a so-called through-image (subject monitoring image), which is a captured image during composition confirmation or moving image recording, is displayed.

Furthermore, the display unit 15 executes various manipulation menus, icons, messages, and the like, that is, display as a graphical user interface (GUI) on the screen on the basis of an instruction from the camera control unit 18.

The communication unit 16 comprehensively indicates various communication devices and communication processing circuits mounted on the imaging device 1.

As the communication by the communication unit 16, various communication circuits and communication devices are provided which can perform communication by a network which is an external communication network (external network communication), local communication with a portable terminal, and master/slave communication between corresponding devices such as between a main imaging device and a sub-imaging device as an aspect of local communication.

Therefore, the imaging device 1 transmits and receives captured image data (still image file or moving image file), metadata, various parameters, and the like to and from, for example, external information processing device, imaging device, display device, recording device, reproduction device, and the like.

More specifically, the communication unit 16 includes, as a network communication unit, some or all of a function of performing communication by a mobile communication network such as 4G or 5G, an Internet line, a home network, a local area network (LAN), or the like, a function of performing short-range wireless communication such as Bluetooth (registered trademark), Wi-Fi (registered trademark) communication, or near field communication (NFC), a function of performing infrared communication or the like, a function of performing wired connection communication with another device, and the like.

The manipulation unit 17 collectively indicates input devices for the user to perform various manipulation inputs. Specifically, the manipulation unit 17 indicates various manipulation elements (keys, dials, touch panels, touch pads, and the like) provided on the housing of the imaging device 1.

The manipulation of the user is detected by the manipulation unit 17, and signals according to the input manipulation is transmitted to the camera control unit 18.

The camera control unit 18 includes a microcomputer (arithmetic processing device) including a central processing unit (CPU).

The memory unit 19 stores information and the like used for processing by the camera control unit 18. As the illustrated memory unit 19, for example, a read only memory (ROM), a random access memory (RAM), a flash memory, and the like are comprehensively illustrated.

The memory unit 19 may be a memory area built in a microcomputer chip as the camera control unit 18, or may be configured by a separate memory chip.

The camera control unit 18 executes a program stored in the ROM, the flash memory, or the like of the memory unit 19 to control the entire imaging device 1.

For example, the camera control unit 18 controls operations of necessary respective units, such as control of a shutter speed of the imaging element unit 12, an instruction of various types of signal processing in the camera signal processing unit 13, an imaging operation and a recording operation according to a user's manipulation, a reproduction operation of a recorded image file, an operation of the lens system 11 such as zooming, focusing, and aperture adjustment in a lens barrel, a user interface operation, and setting of a communication scheme and a transmission destination by the communication unit 16.

The RAM in the memory unit 19 is used for temporary storage of data, programs, and the like as a work area at the time of various types of data processing of the CPU of the camera control unit 18.

The ROM or the flash memory (nonvolatile memory) in the memory unit 19 is used for storing an operating system (OS) for the CPU to control each unit, content files such as image files, application programs for various operations, firmware, various types of setting information, and the like.

The various types of setting information include communication setting information, exposure setting as setting information regarding an imaging operation, shutter speed setting, mode setting, white balance setting as setting information regarding image processing, color setting, setting regarding image effects, custom key setting and display setting as setting information regarding manipulability, and the like.

The driver unit 22 is provided with, for example, a motor driver for a zoom lens drive motor, a motor driver for a focus lens drive motor, a motor driver for a motor of an aperture mechanism, and the like.

These motor drivers apply a drive current to a corresponding driver according to an instruction from the camera control unit 18, and cause the drivers to execute movement of the focus lens and the zoom lens, opening and closing of an aperture blade of the aperture mechanism, and the like.

The sensor unit 23 comprehensively indicates various sensors mounted on the imaging device.

For example, an inertial measurement unit (IMU) is mounted as the sensor unit 23. For example, an angular velocity (gyro) sensor of three axes of pitch, yaw, and roll can detect an angular velocity, and an acceleration sensor can detect an acceleration.

Furthermore, as the sensor unit 23, for example, a position information sensor, an illuminance sensor, or the like may be mounted.

Furthermore, it is assumed that a distance measuring sensor is provided as the sensor unit 23. The distance from the imaging device 1 to the subject can be measured at the time of imaging by the distance measuring sensor, and the distance information can be added as metadata to the captured image.

Various types of information detected by the sensor unit 23, for example, position information, distance information, illuminance information, IMU data, and the like are added as metadata to the captured image together with date and time information managed by the camera control unit 18.

The power supply unit 24 outputs a power supply voltage VCC necessary for each unit using a battery 24a as a power supply. On/off of the supply of the power supply voltage VCC by the power supply unit 24, that is, on/off of the power supply of the imaging device 1 is controlled by the camera control unit 18. Furthermore, the camera control unit 18 can detect the capacity of the battery 24a, that is, the remaining battery capacity.

Note that the power supply unit 24 may be configured to be able to output the power supply voltage VCC on the basis of an external power supply, for example, by connecting an AC adapter or receiving supply of a DC power supply voltage.

2. Focus Control According to Main Scene

The imaging device 1 of the present embodiment provides focus control according to a main scene.

Specifically, means capable of easily switching a focus control package suitable for the following two scenes as main imaging modes is provided.

Note that the above processing for setting change, display, and the like is performed by the camera control unit 18.
[Imaging while Walking]

This is a scene for the user to capture an image while walking.

In this case, it is preferable to immediately focus on an object to be shown, such as a selfie face, a landscape, a street, a store, or a product.
[Imaging while Standing]

This is a scene for the user to capture an image in a state where the imaging device 1 is placed on a desk or the like.

For example, at the time of review imaging of a product or the like, it is preferable to focus on the face in a case where the user (moving image poster) is speaking to the imaging device 1, and focus on an object in a case of presenting and explaining the object.

Assuming such imaging while walking and imaging while standing, it is preferable to control on/off of a face priority function and a moving image camera shake correction function at the time of autofocus (AF) according to the imaging while walking and the imaging while standing.

Note that the face priority at the time of AF is a setting for performing focus control with a face (or pupil) as a priority target at the time of autofocus.

The moving image camera shake correction function is a function of correcting an image such that the influence of camera shake generated in the moving image is reduced by electronic camera shake correction processing, for example.

In the present embodiment, as setting values for the main scene as the imaging while walking and the imaging while standing, simple switching of on/off of the setting values of "face priority at the time of AF" and "moving image camera shake correction" is realized.

As for the positioning of the function, for example, the imaging while walking is set as a default, and the imaging while standing is set as a switching function.

For example, the setting of the imaging while standing is called a "product review setting" or a "setting for product review", and "ON" or "OFF" is changed according to the manipulation.

That is, the "product review setting" is set to "OFF" in the case of the imaging while walking, and the "product review setting" is set to "ON" in the case of the imaging while standing.

The "product review setting" is a setting suitable for an imaging scene in which, for example, a product is held in a hand and brought close to the imaging device 1. In a case where a moving image of reviewing a product is captured, there is a case where it is desired to quickly focus on the product brought close to the camera instead of the face, and the AF operation can be appropriately executed.

For example, a manipulation of such a function is initially assigned to the custom button 110C2. However, a dedicated manipulation element 110 may be prepared.

Therefore, the user can use the product review setting with a one-touch operation (one push) without performing complicated setting. That is, since this function can be easily used by pressing a button such as the custom button 110C2 once, manipulability of imaging at the time of the product review or the like is greatly improved.

Furthermore, the user can switch between "ON" and "OFF" of the product review setting by a toggle manipulation using the custom button 110C2.

Note that, in addition to the custom button 110C2, the "product review setting" is prepared as one of the imaging auxiliary items in the menu screen as illustrated in FIG. 3A, and "ON" and "OFF" can be set.

Furthermore, the "product review setting" may be prepared in one of a function menu 50 (menu on an imaging standby screen) as illustrated in FIG. 3B.

Note that the switching manipulation of the product review setting may also be disabled even by the manipulation of the custom button 110C2 or the like described above.

In the still image capturing mode, in a case where the setting mode is scene selection or a panorama mode, the switching to the product review setting is disabled. Therefore, in a case where the user manipulates the custom button 110C2 or the like in these cases, a caution output is performed to provide notification of the disablement.

In the present embodiment, both the setting values of the "face priority at the time of AF" and the "moving image camera shake correction" are changed by toggling "ON" and "OFF" by the manipulation of "ON" and "OFF" of the product review setting.

In a case where the product review setting is set to "ON", the setting values of the "face priority at the time of AF" and the "moving image camera shake correction" become "OFF", and the display of the setting values is grayed out, and is in a temporary exclusive state.

Even in a case where an exposure mode is switched to PASM (P: program auto, A: aperture priority, S: shutter speed priority, M: manual exposure), the display of both the setting values of the "face priority at the time of AF" and the "moving image camera shake correction" is grayed out, and is maintained in the temporary exclusive state (unchangeable).

In order to enable both the setting values to be changed, the product review setting is set to "OFF" in any mode, and temporary exclusion is released.

In a case where both grayed-out menus are selected, a caution output is performed to guide the user to set the product review setting to "OFF" (release).

Furthermore, by mounting the switching function, the exclusion of the "face priority at the time of AF" setting, which is exclusive in an auto mode, is released, and the product review setting can be changed in the "OFF" state.

Furthermore, even in a case where the "face priority at the time of AF" is turned "OFF" by "ON" of the product review setting, the icon display is grayed out and cannot be changed while the face priority at the time of multi light metering remains "ON" in order to secure the face recognition accuracy.

Figures 4A, 4B:
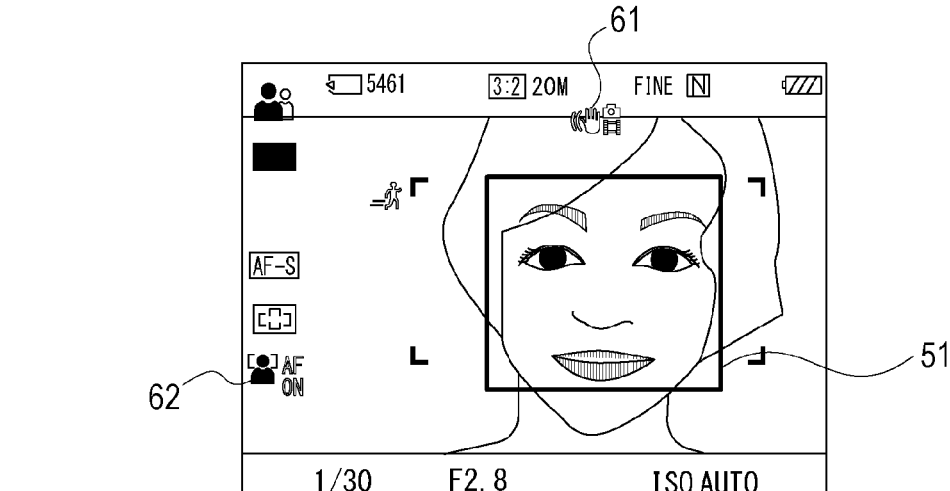
FIGS. 4A and 4B are explanatory diagrams of a display example of an autofocus frame of the embodiment.

FIGS. 4A and 4B illustrate a display example of AF at the time of imaging in the auto mode.

FIG. 4A illustrates a case where the "face priority at the time of AF" is "ON" and the "face priority at the time of multi light metering" is "ON".

In this case, a person scene is recognized, and a focus frame 51 is displayed on the face.

A camera shake correction icon 61 and an AF icon 62 display the on state.

FIG. 4B illustrates a case where the "face priority at the time of AF" is "OFF" and the "face priority at the time of multi light metering" is "ON".

In this case, the person scene is recognized, but the focus frame is not always displayed on the face. A focus frame 52 is displayed on the article.

The camera shake correction icon 61 and the AF icon 62 display the off state. Note that, as the display example of the off state, various examples such as "display 'off' for the icon", "display 'off' on the icon", "gray out the icon", and "draw a diagonal line on the icon" can be considered.

The product review setting is a target for a setting reset (imaging setting reset, initialization).

Furthermore, the product review setting is a saving target as my menu setting (custom menu setting).

A screen display example in a case where the imaging while walking and the imaging while standing are switched by "OFF" and "ON" of the product review setting will be described.

The following display is performed as a screen example for presenting a manipulation method and a setting state to the user.

Figure 5A:
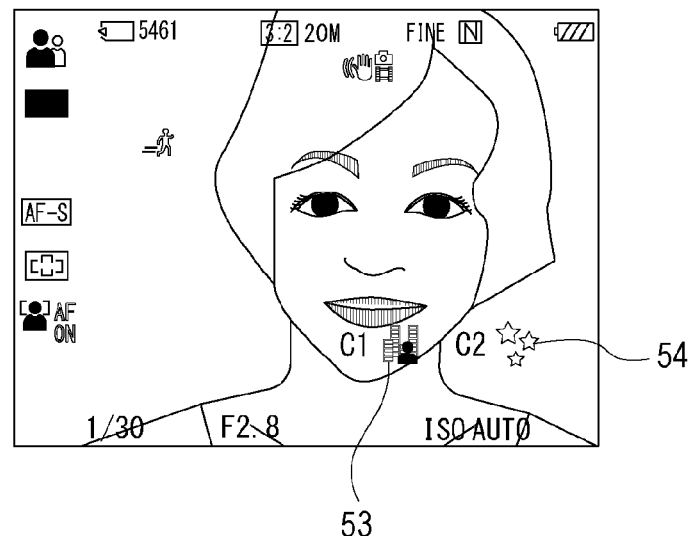
FIGS. 5A and 5B are explanatory diagrams of a display example regarding product review setting of the embodiment.

FIG. 5A is a display example of a custom button assignment icon.

As an assignment presentation icon 53, display indicating the manipulation function assigned to the custom button 110C1 is performed.

Furthermore, as an assignment presentation icon 54, display indicating the manipulation function assigned to the custom button 110C2 is performed. In this case, as the assignment presentation icon 54, assignment of the custom button 110C2 to the manipulation of "ON" and "OFF" of the product review setting is displayed.

Figure 5B:
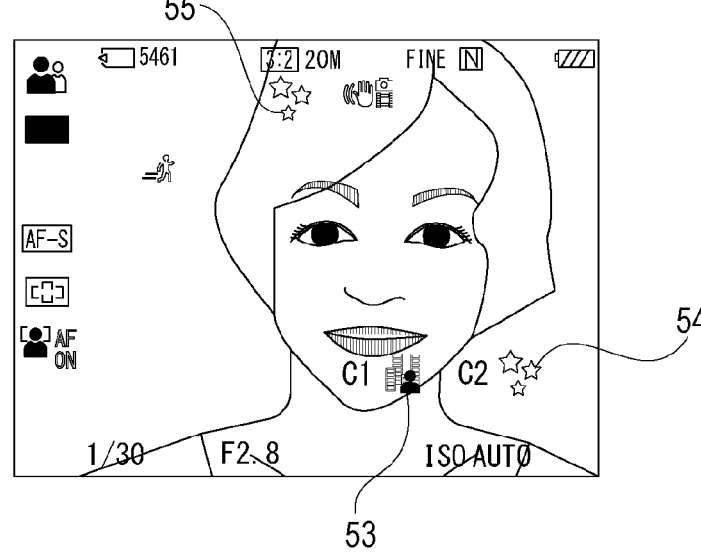

FIG. 5B illustrates an example in which a product review setting icon 55 is displayed.

In a case where the product review setting is "ON", the product review setting icon 55 indicating such a fact is displayed, and it is presented that the state suitable for the imaging while standing is made.

Note that, as the appealing frame display, display recommending "ON" of the product review setting may be performed according to the imaging while standing.

Figures 6A, 6B:
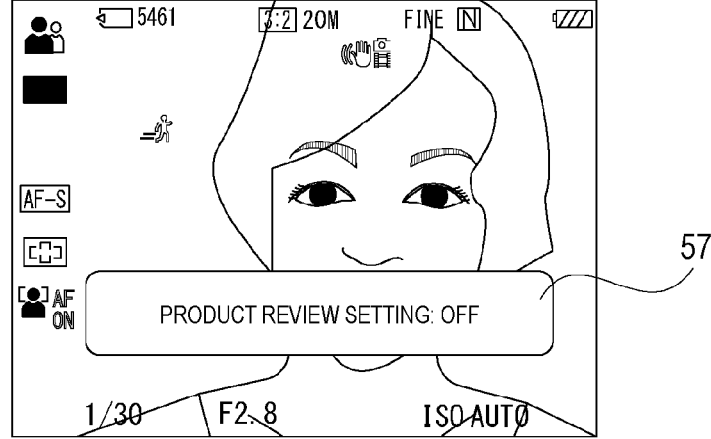
FIGS. 6A and 6B are explanatory diagrams of a caution display example regarding product review setting of the embodiment.

FIGS. 6A and 6B are examples of the caution output of the setting value change.

For example, in a case where the user presses the custom button 110C2 to set the product review setting to "ON", a caution notification 56 as in FIG. 6A is displayed, for example, for a predetermined time, so as to recommend to fix the camera and capture an image at the time of the moving image capturing.

For example, in a case where the user presses the custom button 110C2 again to set the product review setting to "OFF", a caution notification 57 as in FIG. 6B is displayed, for example, for a predetermined time so as to provide notification that the product review setting is set to "OFF".

Figure 7A:
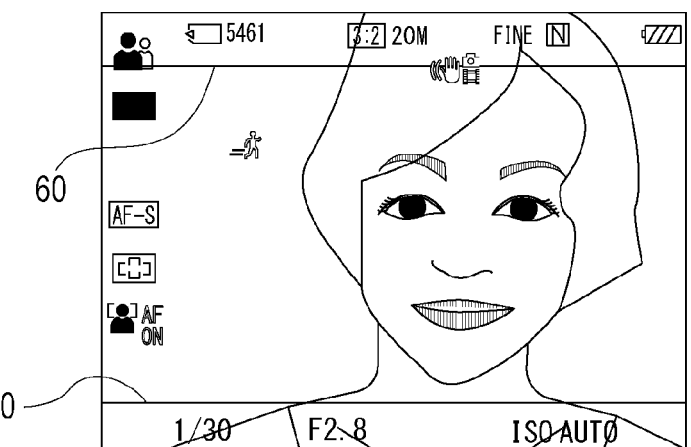
FIGS. 7A and 7B are explanatory views of a guide frame display example of the embodiment.
Figure 7B:
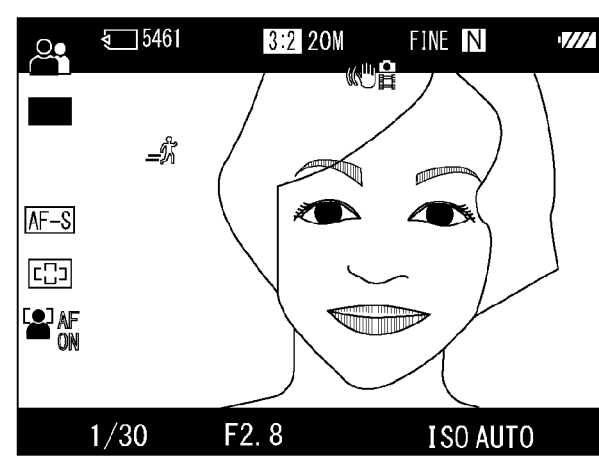

FIGS. 7A and 7B are screen examples at the time of "ON" of the product review setting. On a still image capturing standby screen, a guide frame 60 indicating a range of the aspect ratio of 16:9 is displayed as illustrated in FIG. 7A.

At the time of the moving image capturing, by capturing a moving image having an aspect ratio of 16:9, the upper end portion and the lower end portion are in a black back state as illustrated in FIG. 7B.

The angle of view and the aspect ratio are different between the moving image capturing and the still image capturing, but, by the display of the guide frame 60, the user can check a visual field range in the moving image capturing before the start of the moving image capturing.

Note that, in the above description, an example has been described in which on and off of both the setting values of the "face priority at the time of AF" and the "moving image camera shake correction" are switched as the setting values for the main scene as the imaging while walking and the imaging while standing. However, an example is also conceivable in which on and off of one of the setting values of the "face priority at the time of AF" and the "moving image camera shake correction" are switched as the setting values for the main scene as the imaging while walking and the imaging while standing. For example, in a case where the product review setting is set to "ON", the setting value of the "face priority at the time of AF" may be switched to "OFF", and in a case where the product review setting is set to "OFF", the setting value of the "face priority at the time of AF" may be switched to "ON".

3. Depth Switching

The imaging device 1 of the present embodiment provides a depth switching function that satisfies the need for image creation. Note that the depth switching function here changes the depth of field to switch the blurring state of the background image, and can also be referred to as a "background blur switching" function.

Specifically, as image creation during imaging, the background can be immediately switched between [blur] and [sharpen].

In particular, the background blur switching is performed such that the background at the time of selfie can be switched to "blur" or "sharpen" by a one-touch operation (one push) of the manipulation element such as a button.

Therefore, in a case where it is desired to blur the background to obtain an impressive video in which the main character stands out, or in a case where it is desired to show the background information sharpen in addition to the main character, such as the scenery during travel, it is possible to instantaneously switch the expression even during imaging.

For this purpose, for example, there is provided means capable of instantaneously switching between two values of the "blur (shallow depth of field)" and the "sharpen (deep depth of field)" while securing the image quality.

Note that the above control for switching the depth of field and the like is performed by processing of the camera control unit 18.

For example, the aperture is switched between two values of "open" and "predetermined F-number" (for example, F4.0) so as to immediately change the depth of field as image creation assistance during imaging.

Of course, the present technology is not limited to this numerical value, and switching is only required to perform between a first predetermined F-number for increasing the depth of field and a second predetermined F-number for decreasing the depth of field.

Therefore, the image creation of the "background blur" and the "background sharpen" is immediately realized.

Means for switching between "blur" and "sharpen" of the "background" in a toggle manner is provided to the user.

For example, the custom button 110C1 is assigned to this manipulation in the initial state. However, the dedicated manipulation element 110 may be prepared.

The user can switch between "blur" and "sharpen" of the background by a toggle manipulation using the custom button 110C1.

Note that, in addition to the custom button 110C1, the manipulation can be performed by the menu screen as illustrated in FIG. 3A or the function menu 50 as illustrated in FIG. 3B, but such a menu manipulation may not be provided from the viewpoint of immediacy.

Figures 8A, 8B:
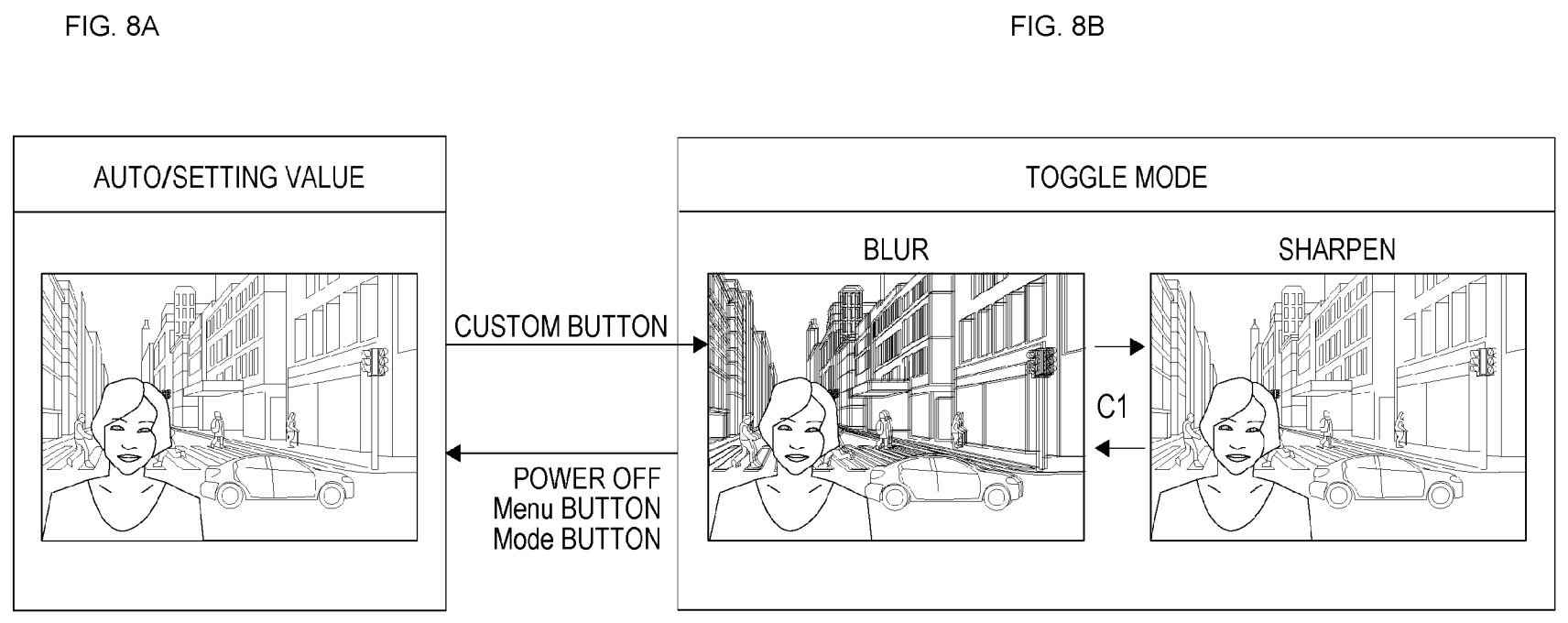

FIGS. 8A and 8B illustrate display examples of through-images according to the manipulation.

FIG. 8A illustrates a mode/state in which the F-number is automatically switched, a mode/state in which the F-number is changed with a fixed setting value, and the like.

In a case where the user manipulates the custom button 110C1, the mode enters the toggle mode of FIG. 8B, and the background is set to a "blur" state.

In a case where the mode enters the toggle mode, the state transitions to the "blur" state regardless of the state at the time of entry. Note that the present technology is not limited to this case, and the "blur" state may not necessarily be set at the beginning in a case of entering the toggle mode. For example, the state before entering the toggle mode may be continued.

In this toggle mode, whenever the user manipulates the custom button 110C1, the state of the background between "blur" and "sharpen" is switched.

The toggle mode is released by predetermined manipulation and condition.

For example, the toggle mode is released in a case where the power is turned off (power off manipulation, and automatic power off without manipulation for certain time), in a case where a menu button is manipulated, in a case where a mode button is manipulated, or the like.

Note that the switching manipulation of the background between "blur" and "sharpen" may also be disabled by the manipulation of the custom button 110C1 described above.

In the scene selection mode and the panorama mode among the still image capturing modes, even in a case where the custom button 110C1 is manipulated, entry into the toggle mode or switching in the toggle mode is disabled. Therefore, in a case where the user manipulates the custom button 110C1 in these cases, a caution output is performed to provide notification of the disablement.

In a period in which the switching between "blur" and "sharpen" is performed in the toggle mode, the F-number is changed between predetermined values such as "F8.0", for example, as the first predetermined F-number for increasing the depth of field and "F2.0", for example, as the second predetermined F-number for decreasing the depth of field. Of course, the specific F-number is determined according to the lens.

It is assumed that these numerical values are selected according to each model and each state.

In a case of entering the toggle mode of switching between "blur" and "sharpen", the F-number is changed between the first predetermined F-number and the second predetermined F-number by a switching manipulation during the toggle mode.

In this case, the F-number is not overwritten and updated, but is temporarily changed between the first predetermined F-number and the second predetermined F-number.

Furthermore, the F-number can be changed even in the toggle mode.

At the time of a change manipulation other than the manipulation of the custom button 110C1, the toggle mode is released, and the mode is returned to the value (state) before the toggle mode transition.

At the time of entering the toggle mode, the transition is made to the second predetermined F-number ("blur") regardless of the value before the transition.

In a case of the transition from "blur" to "sharpen", the value is changed to the first predetermined F-number even in a case where the automatic exposure (AE) control is not interlocked.

In a case where the toggle mode is released, the mode returns to the value (state) before the mode transition.

The switching setting of "blur" and "sharpen" is a target for a setting reset (imaging setting reset, initialization).

A screen display example will be described.

In the still image capturing mode, in a case of the scene selection or the panorama mode, the switching is disabled.

At the time of reproduction, the normal F-number is displayed as a numerical value instead of the expression of "blur" or "sharpen".

Figure 9A:
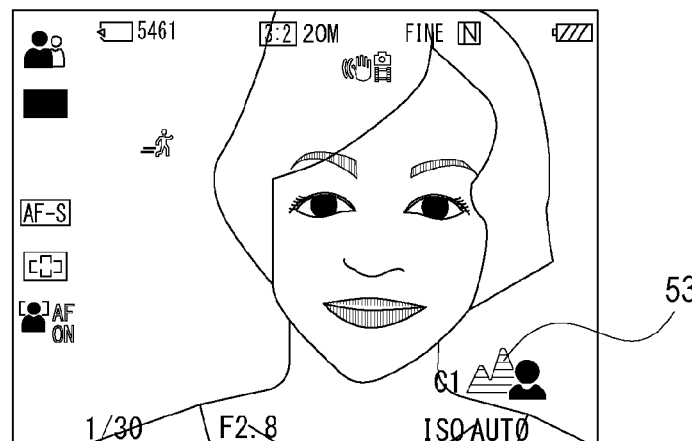
FIGS. 9A, 9B, and 9C are explanatory diagrams of a display example regarding switching of a depth of field of the embodiment.

FIG. 9A illustrates a display example illustrating a state in which the manipulation function of switching between "blur" and "sharpen" is assigned to the custom button 110C1 as the assignment presentation icon 53.

Figure 9B:
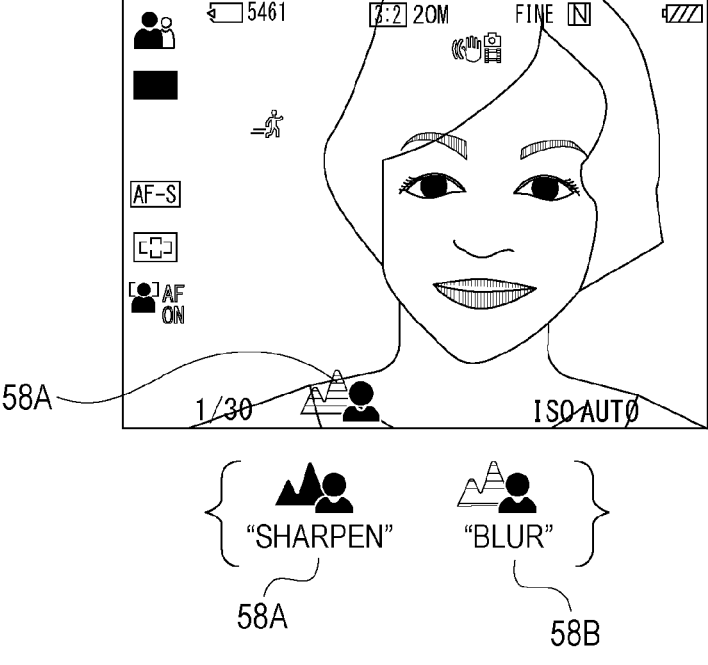

FIG. 9B is a display example in the toggle mode.

In the lower portion (footer) of the screen, an icon 58B indicating "blur" or an icon 58A indicating "sharpen" is displayed in a region where the F-number is normally displayed.

Figure 9C:
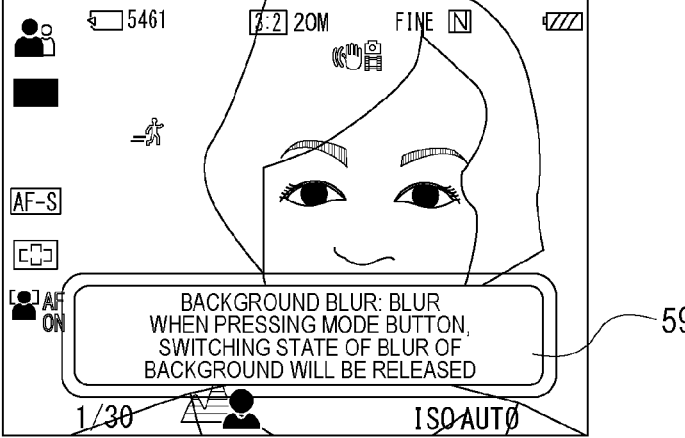

FIG. 9C is an example of the caution output of the setting value change.

In a case where the user presses the custom button 110C1 to enter the toggle mode, a caution notification 59 as illustrated in FIG. 9C is displayed, for example, for a predetermined time, to present that the mode enters the toggle mode for switching between "blur" and "sharpen" of the background. Furthermore, a method of releasing the toggle mode such as "when pressing the MODE button, the blur switching state of the background will be released" is also presented.

Note that, in a case where the toggle mode is released by the manipulation of a mode button or the like, a message such as "the blur switching state of the background is released" is displayed.

4. Switching of Imaging Mode

The imaging device 1 of the present embodiment provides an imaging mode switching function for switching a plurality of imaging modes. The imaging mode referred to herein is a mode corresponding to a type of imaging such as still image capturing, moving image capturing at 1× speed, and moving image capturing of slow motion or quick motion, and the "imaging mode switching function" is a function of switching such types of imaging.

Specifically, the still image capturing mode, the moving image capturing mode at a reference frame rate, and the moving image capturing mode at a frame rate different from the reference frame rate (moving image capturing mode of slow motion or quick motion) can be switched.

In particular, the switching of the imaging mode can be performed by a one-touch operation of the manipulation element such as a button.

Therefore, for example, in a case where it is desired to capture a still image, a slow motion moving image, or a quick motion moving image from time to time while capturing a moving image at the reference frame rate, switching can be performed instantaneously.

Note that the above control for switching the imaging mode and the like is performed by processing of the camera control unit 18.

The present embodiment provides means for switching three stages of imaging modes including a "still image mode", a "moving image mode", and an "S&Q mode" for performing variable speed moving image recording.

The "still image mode" is an imaging mode for executing still image capturing/recording.

The "moving image mode" is an imaging mode for executing moving image capturing/recording at the reference frame rate. The moving image mode is used for normal moving image capturing at a so-called 1× speed. The reference frame rate is a frame rate for 1× speed moving image recording generally adopted in moving image capturing by a camera, and is set to, for example, 30 frame per second (fps).

The "slow&quick motion mode (S&Q mode)" is an imaging mode for executing moving image capturing/recording at a frame rate different from the reference frame rate. As the S&Q mode, it is possible to execute moving image capturing of either slow motion imaging or quick motion imaging.

Therefore, in the switching of three stages of the imaging modes of the "still image mode", the "moving image mode", and the "S&Q mode", switching among the still image capturing, the moving image capturing, and the slow motion imaging, or switching among the still image capturing, the moving image capturing, and the quick motion imaging is performed.

In the S&Q mode, which of the slow motion imaging and the quick motion imaging is executed, and furthermore, how many times slower/faster (which speed is set) as compared with the moving image mode can be separately set as one of setting items in the menu screen as illustrated in FIG. 3A or the function menu 50 of FIG. 3B, for example.

For example, as the S&Q mode, slow motion imaging twice slower (that is, "2× slow") or quick motion imaging twice faster (that is, "2× quick") as compared to the moving image mode can be executed. In order to realize such slow/quick moving image capturing, the frame rate of the S&Q mode can be set to a value higher or lower than the reference frame rate.

In the switching from another imaging mode to the S&Q mode, the setting stored in the memory unit 19 is referred to for the S&Q mode, and slow motion/quick motion imaging at the speed according to the setting is made executable.

Furthermore, for the imaging mode described above, for example, various setting modes, which are a package of settings in imaging, such as an exposure mode of the PASM, a scene selection mode according to a subject or an environment to be captured, are prepared.

The setting mode can be selected for each imaging mode. The user can perform various types of imaging with desired settings by combining the imaging mode and the setting mode.

Means for switching a plurality of imaging modes in a toggle manner is provided to the user. Furthermore, means for selecting the setting mode is separately provided.

In the present embodiment, the mode button 110M is prepared as the manipulation element dedicated to switching the imaging mode, and the setting mode is provided as one of the setting items, for example, in the menu screen and the function menu 50 to provide a setting screen for setting mode selection. That is, the user can switch the imaging mode by a toggle manipulation using the mode button 110M, and select the setting mode from the setting screen.

Since switching of the imaging mode can be performed by a one-touch operation (one push) using the mode button 110M, the manipulation is easy particularly in a case where the user performs imaging by directing the imaging device 1 toward the user as a selfie.

Figure 10:
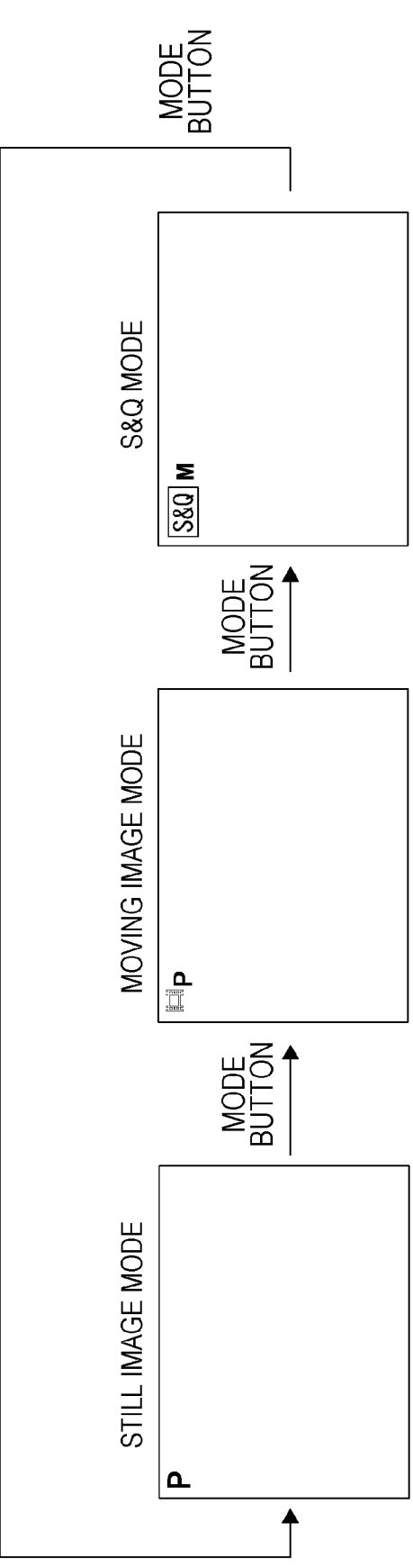
FIG. 10 is an explanatory diagram of switching of an imaging mode of the embodiment.

FIG. 10 schematically illustrates switching of the imaging mode according to the manipulation.

In a case where the user manipulates the mode button 110M, the imaging mode is switched in a toggle manner.

In the switching of the imaging mode, a plurality of predetermined imaging modes is switched in a toggle manner in a predetermined order. That is, the order cannot be skipped or returned in the reverse direction, and the switching is repeatedly performed in a predetermined order.

In the present embodiment, as illustrated in the drawing, three stages of predetermined imaging modes of the still image mode, the moving image mode, and the S&Q mode are switched in this order.

At the time of switching the imaging mode, the type of imaging is changed according to the switching, and the setting mode and the setting value set for the switched imaging mode are applied.

For example, in a case where the setting mode of "program auto" as the moving image mode and "manual exposure" as the S&Q mode is set, in a case where the imaging mode is switched from the "moving image mode" to the "S&Q mode", the setting mode is switched from the "program auto" to the "manual exposure".

Next, a screen display example in switching of the imaging mode will be described.

Figure 12A:
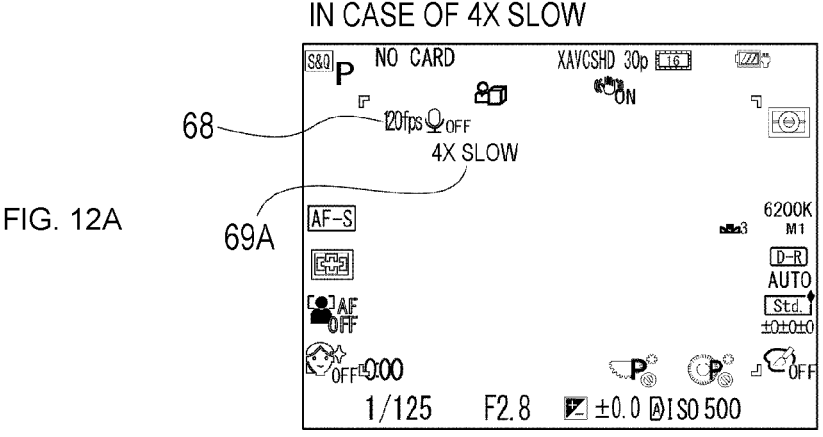
FIGS. 12A and 12B are explanatory diagrams of another display example regarding switching of an imaging mode of the embodiment.
Figure 12B:
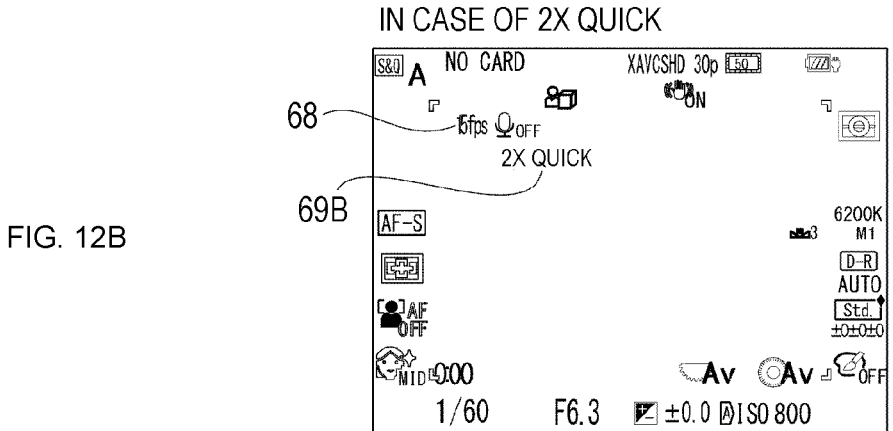

FIGS. 11A, 11B, and 11C illustrate screen display examples in the still image mode, the moving image mode, and the S&Q mode. FIGS. 12A and 12B illustrate other screen display examples in the S&Q mode.

In the present embodiment, the display mode of the icon is made different for each imaging mode. These icons are displayed, for example, by being superimposed on the through-image. Since the display mode is different for each imaging mode, the user can easily grasp the current imaging mode.

For example, mode icons 63 (63A, 63B, 63C, and the like) of different display modes are displayed on the upper left of the screen according to the imaging mode applied by switching.

The mode icon 63 is an icon indicating an imaging mode and a setting mode set for the imaging mode. For example, the mode icon 63A of FIG. 11A indicates the "still image mode by program auto", the mode icon 63B of FIG. 11B indicates the "moving image mode by program auto", and the mode icon 63C of FIG. 11C indicates the "S&Q mode by manual exposure".

In the illustrated example, as the mode icon 63, an icon indicating only the setting mode is used in the still image mode. However, in the moving image mode, an icon obtained by combining an icon imitating a film and an icon indicating the setting mode is used in the moving image mode, and an icon obtained by combining an icon in which "S&Q" is written and an icon indicating the setting mode is used in the S&Q mode. By displaying the mode icon 63 of different designs for each imaging mode in this manner, it is possible to clearly notify the user of the current imaging mode.

Furthermore, a recordable amount (such as the number of still images that can be captured) and a specific setting value according to the imaging mode are displayed.

In the display examples of FIGS. 11A, 11B, and 11C, as the display regarding the remaining amount of the memory according to the imaging mode, a remaining amount display 64A indicating the number of still images that can be captured, a remaining amount display 64B indicating a time for which the moving image can be captured in the moving image mode, and a remaining amount display 64C indicating a time for which the moving image can be captured in the S&Q mode are displayed on the upper portion of the screen.

Furthermore, in the display examples of FIGS. 11A, 11B, and 11C, a setting display region according to the imaging mode is provided at the upper portion of the screen. An image size and an image quality setting value of the still image are displayed in a setting display region 65A of the still image mode of FIG. 11A, and various setting states of a moving image recording format, a storage method, and proxy setting are displayed in setting display regions 65B and 65C in the moving image mode of FIG. 11B and the S&Q mode of FIG. 11C.

Further, in the moving image mode and the S&Q mode in which moving image is captured, moving image recording displays 66B and 66C indicating the moving image recording state are displayed, a sound recording display 67B regarding sound recording is displayed in a case where sound is recorded, and a sound recording display 67C is displayed in a case where sound is not recorded.

Furthermore, in the S&Q mode, display indicating the frame rate set in the S&Q mode is performed. For example, a frame rate value 68 is displayed as illustrated in FIG. 11C.

Furthermore, the speed compared with the frame rate of the moving image mode may be displayed together as in a speed display 69A of "4× slow" of FIG. 12A or a speed display 69B of "2× quick" of FIG. 12B. By displaying the speed, the user can intuitively recognize the type of imaging. Therefore, even the user who is unfamiliar with frame rate notation can effectively utilize the S&Q mode.

Note that, FIGS. 12A and 12B illustrate an example in which the frame rate value 68 and the speed display 69 (69A, 69B) are displayed together, but only the speed display 69 may be displayed.

Figures 13A, 13B, 13C:
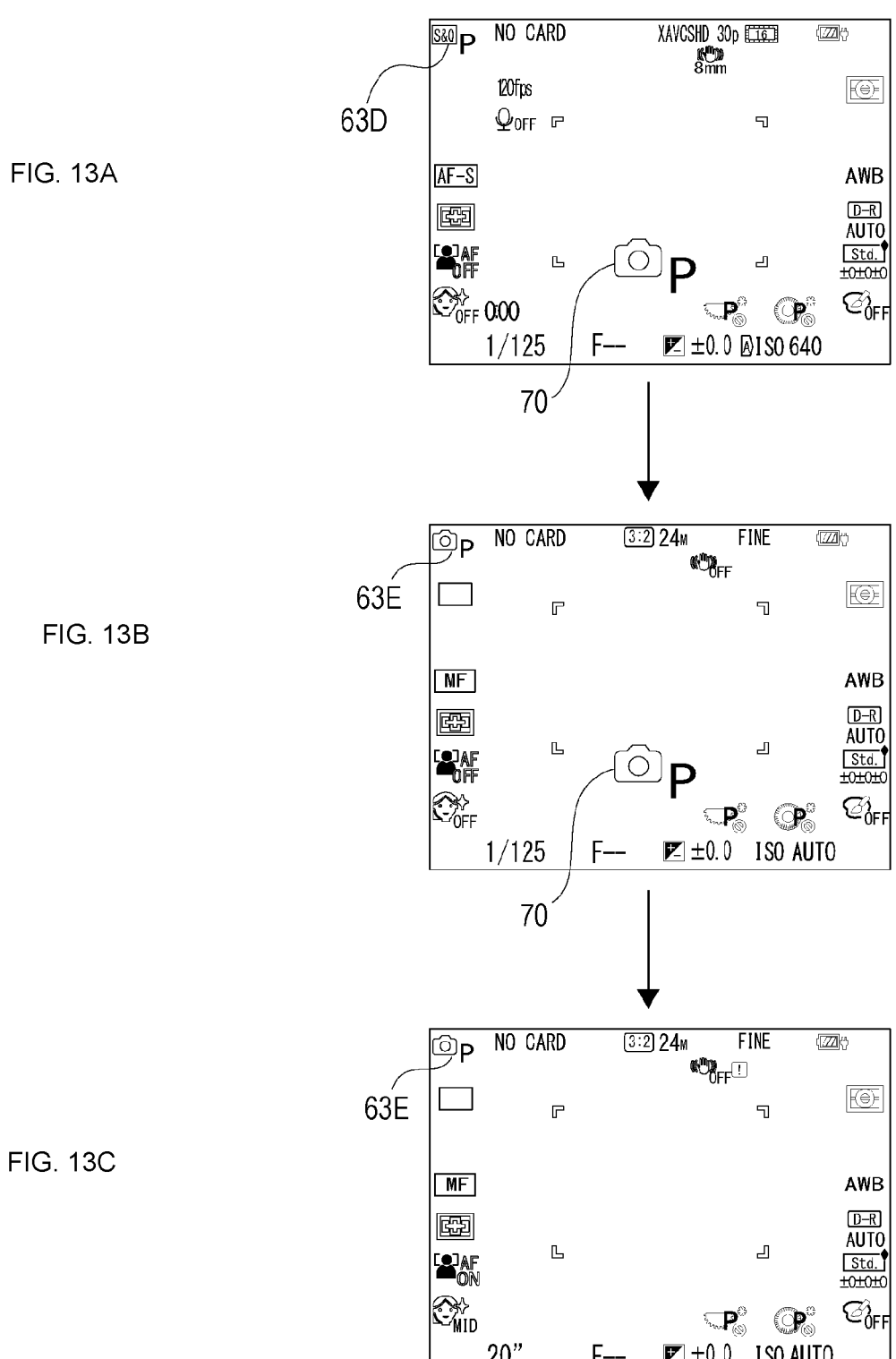
FIGS. 13A, 13B, and 13C are explanatory diagrams of display transition regarding switching of an imaging mode of the embodiment.

Next, the display transition of the icon at the time of switching the imaging mode will be described with reference to FIGS. 13A, 13B, and 13C. FIGS. 13A, 13B, and 13C illustrate an example of the display transition of the icons in a case where the mode is switched from the S&Q mode to the still image mode.

FIG. 13A is a display example of icons according to the manipulation of the mode button 110M. In a case where an instruction for switching of the imaging mode is given by the manipulation of the mode button 110M, a mode notification icon 70 is displayed on the lower center of the screen. The mode notification icon 70 is an icon for providing notification of the imaging mode and the setting mode after completion of the switching, and indicates that the "still image mode by program auto" is applied after completion of the switching, in the illustrated example.

Note that, at the stage where the icon display of FIG. 13A is performed, the switching of the imaging mode is not completed. Therefore, as the mode icon 63 indicating the current imaging mode and setting mode on the upper left of the screen, a mode icon 63D indicating "S&Q mode by program auto" is displayed.

Furthermore, the mode notification icon 70 is made larger than the mode icon 63D and other icons on the screen, and is positioned in the vicinity of the center of the screen, so that the visibility is enhanced.

FIG. 13B is an icon display example subsequent to FIG. 13A, and is a display example at a stage where switching of the imaging mode is completed. In a case where the switching of the imaging mode from the S&Q mode to the still image mode is completed, the display mode of the icon is switched from the display mode in the S&Q mode to the display mode in the still image mode. For example, the mode icon 63 on the upper left of the screen is changed from the mode icon 63D indicating the "S&Q mode by program auto" to a mode icon 63E indicating the "still image mode by program auto" which is the imaging mode after switching.

Note that the mode notification icon 70 is continuously displayed even in a case where the switching of the imaging mode is completed.

FIG. 13C is an icon display example subsequent to FIG. 13B. The display of the mode notification icon 70 is ended, for example, after a predetermined time elapses. At the time point when the display of the mode notification icon 70 is ended as illustrated in FIG. 13C, the display transition of the icon at the time of switching the imaging mode is ended.

In this manner, it is possible for the user to easily grasp the imaging mode after the switching by performing display in which the imaging mode after completion of the switching is presented before completion of the switching according to the manipulation, according to the manipulation of giving an instruction on the switching of the imaging mode.

Here, the setting of the setting mode in each imaging mode will be described with reference to FIGS. 14A, 14B, 15A, 15B, 16A, [to] and 16B.

Figure 14B:
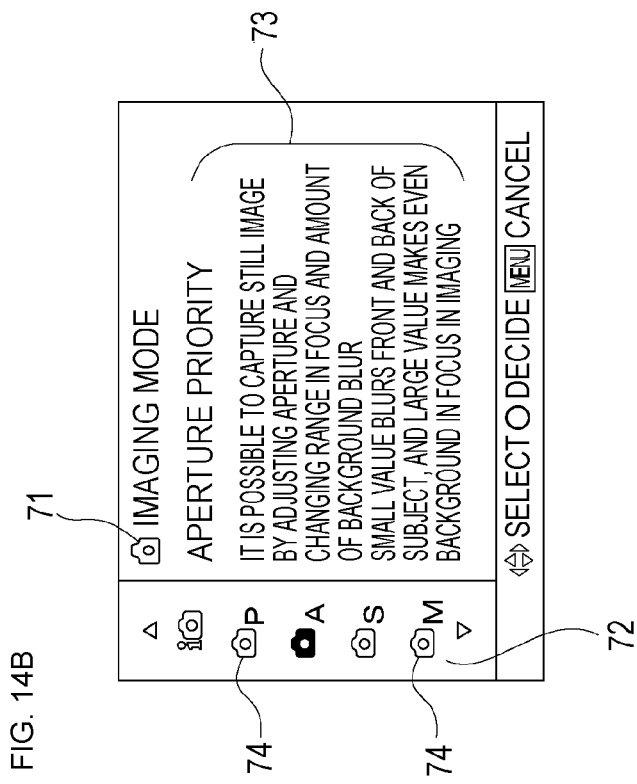
FIGS. 14A and 14B are explanatory diagrams of a setting mode and a display example of a setting screen of the embodiment.
Figure 14A:
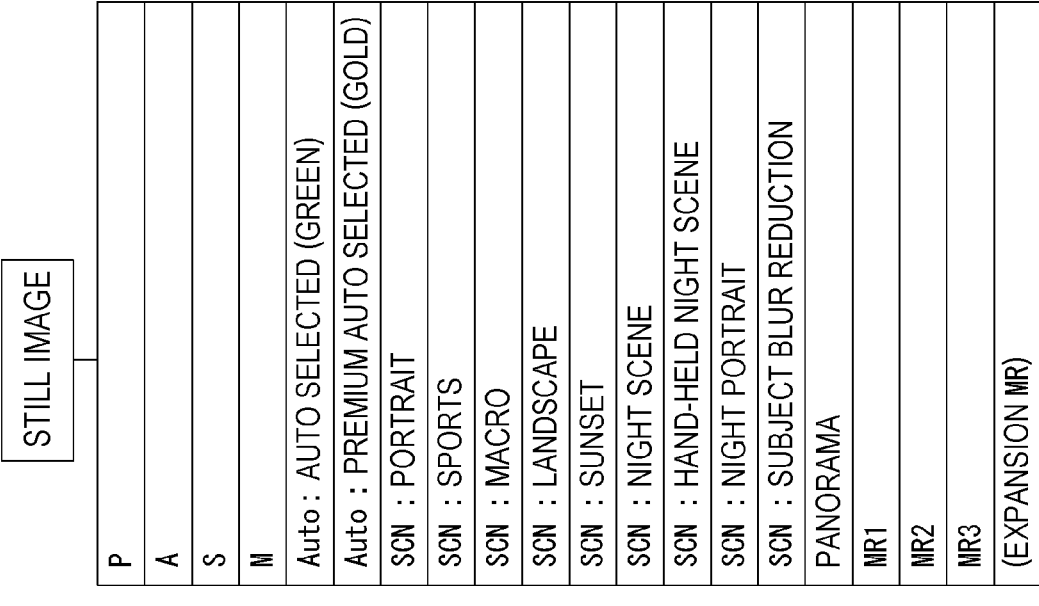
Figures 16A, 16B:
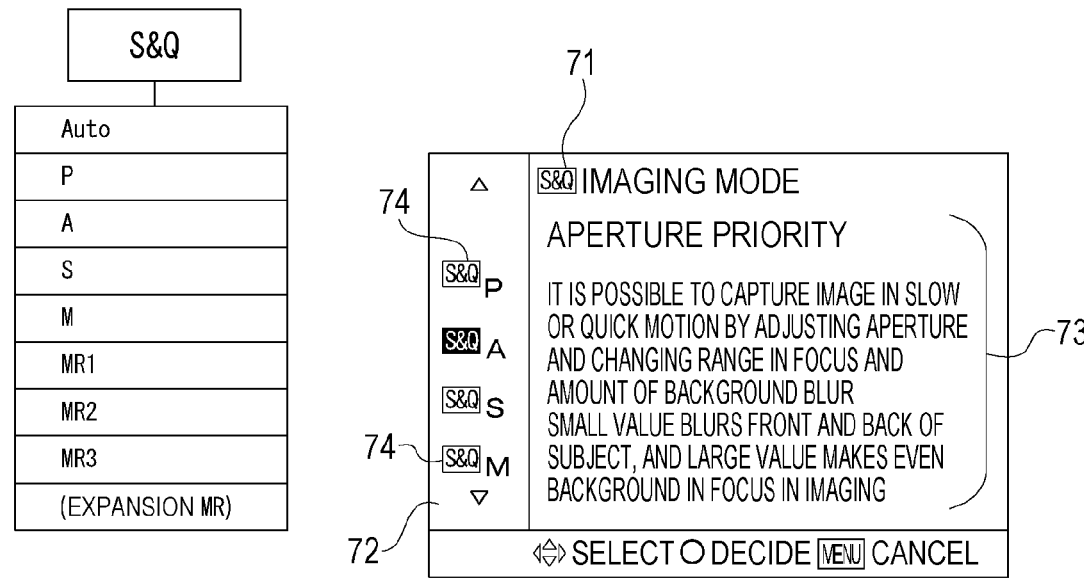
FIGS. 16A and 16B are explanatory diagrams of still another setting mode and a display example of a setting screen of the embodiment.

FIGS. 14A, 15A, and 16A illustrate a list example of setting modes that can be set in the still image mode, the moving image mode, and the S&Q mode. FIGS. 14B, 15B, and 16B illustrate setting screen examples of the setting mode in the still image mode, the moving image mode, and the S&Q mode.

As illustrated in the list example of the setting modes in each imaging mode of FIGS. 14A, 15A, and 16A, in the present embodiment, the setting modes that can be set for each imaging mode are different.

In the present embodiment, the setting mode in the imaging mode can be set on a setting screen for setting mode selection provided for each imaging mode. The display mode of the setting screen for setting mode selection is different for each imaging mode.

In the setting screen examples of FIGS. 14B, 15B, and 16B, the display mode of the icon is different for each imaging mode.

In each setting screen example of FIGS. 14B, 15B, and 16B, an imaging mode display region 71 indicating an imaging mode being set, a setting mode display region 72 for displaying a setting mode that can be set in the imaging mode, and an information presentation region 73 for presenting information of the selected setting mode are provided. In the drawings, a state in which "A (aperture priority)" is selected in each imaging mode is illustrated.

In the imaging mode display region 71, for example, icon display is performed as the display for presenting the imaging mode being set.

In the setting mode display region 72, the setting mode that can be set is displayed by a setting mode icon 74. The setting mode icon 74 has a common design with the mode icon 63, and is prepared in the display mode different for each imaging mode.

Since the display mode is different for each imaging mode in this manner, the user can easily recognize which imaging mode the setting screen being displayed is in. Therefore, it is possible to prevent an error such as changing the setting of an imaging mode different from the intended imaging mode, and perform imaging with a desired setting in each imaging mode.

Note that, in the example described above, an example in which the display mode is made different depending on the icon has been described, but an example in which the display mode is made different is not limited thereto, and various kinds of examples can be considered. For example, the background image of the setting screen of each imaging mode may be different.

In the above, an example has been described in which the three stages of predetermined imaging modes of the still image mode, the moving image mode, and the S&Q mode are switched as the imaging mode switching function, but it is also conceivable to switch the imaging mode by a predetermined stage different from the three stages described above.

For example, the imaging mode may be switched by a predetermined stage including a plurality of slow motion imaging modes (or quick motion imaging modes) having different frame rates, such as three stages of "moving image", "2× slow", and "4× slow", and three stages of "moving image", "2× quick", and "4× quick". Furthermore, the imaging mode may be switched by a predetermined stage including both slow motion imaging and quick motion imaging, for example, four stages of "still image", "moving image", "2× slow", and "2× quick".

In addition, in the above description, the still image capturing mode and various moving image capturing modes are exemplified as the examples of the imaging mode to be switched, but the imaging mode is not limited thereto. For example, a panorama mode in which a panoramic image can be captured by synthesizing images, and a registration calling mode (MR mode) in which frequently used mode and setting registered in advance are called may be regarded as the imaging mode.

Furthermore, a combination of an imaging mode such as the S&Q mode and a setting mode set thereto may be regarded as one imaging mode. For example, the "S&Q mode by program auto" and the "S&Q mode by aperture priority" may be regarded as one imaging mode.

Furthermore, in the above description, the function of switching the three stages of predetermined imaging modes has been described. However, the user may be allowed to select the number of stages and contents of the imaging modes to be switched.

Hereinafter, an example in which the user selects the number of stages and contents of the imaging modes to be switched will be described with reference to FIGS. 17, 18A, 18B, and 18C. Specifically, an example will be described in which the user sets the stage of the imaging mode to be switched by the manipulation of the mode button 110M from the menu screen.

First, an imaging mode executable in the imaging device 1 will be described with reference to FIG. 17.

FIG. 17 illustrates a list of imaging modes that can be executed by the imaging device 1.

The left column of the table in FIG. 17 indicates a mode category in the imaging device 1. The mode category is a category that combines a plurality of imaging modes having a common setting condition. For example, the mode category "still image PASM" combines a plurality of imaging modes in the "still image mode" among all the imaging modes of the imaging device 1.

The center column of the table in FIG. 17 indicates setting modes that can be set in each mode category. For example, in the mode category "still image PASM", each setting mode of "P/A/S/M" can be set. That is, the mode category "still image PASM" includes "still image mode by program auto", "still image mode by aperture priority", "still image mode by shutter priority", and "still image mode by manual exposure".

The right column of the table in FIG. 17 indicates the total number of imaging modes included in each mode category. Since the mode category "still image PASM" includes four types of imaging modes described above, "four types" is written as the total number.

Such a list of FIG. 17 indicates that the imaging device 1 can execute a total of 28 types of imaging modes, and these imaging modes are classified into 8 mode categories.

In a case where switching of three stages of predetermined imaging modes of "still image mode", the "moving image mode", and the "S&Q mode" described in FIG. 10 is provided to the user as the initial setting, three types of imaging modes, for example, "still image mode by program auto", "moving image mode by program auto", and "S&Q mode by manual exposure" are selected in advance from among 28 types of imaging modes.

The user who wants to change the imaging mode to be switched from the initial setting selects desired imaging modes from among 28 types of imaging modes.

Figures 18A, 18B, 18C:
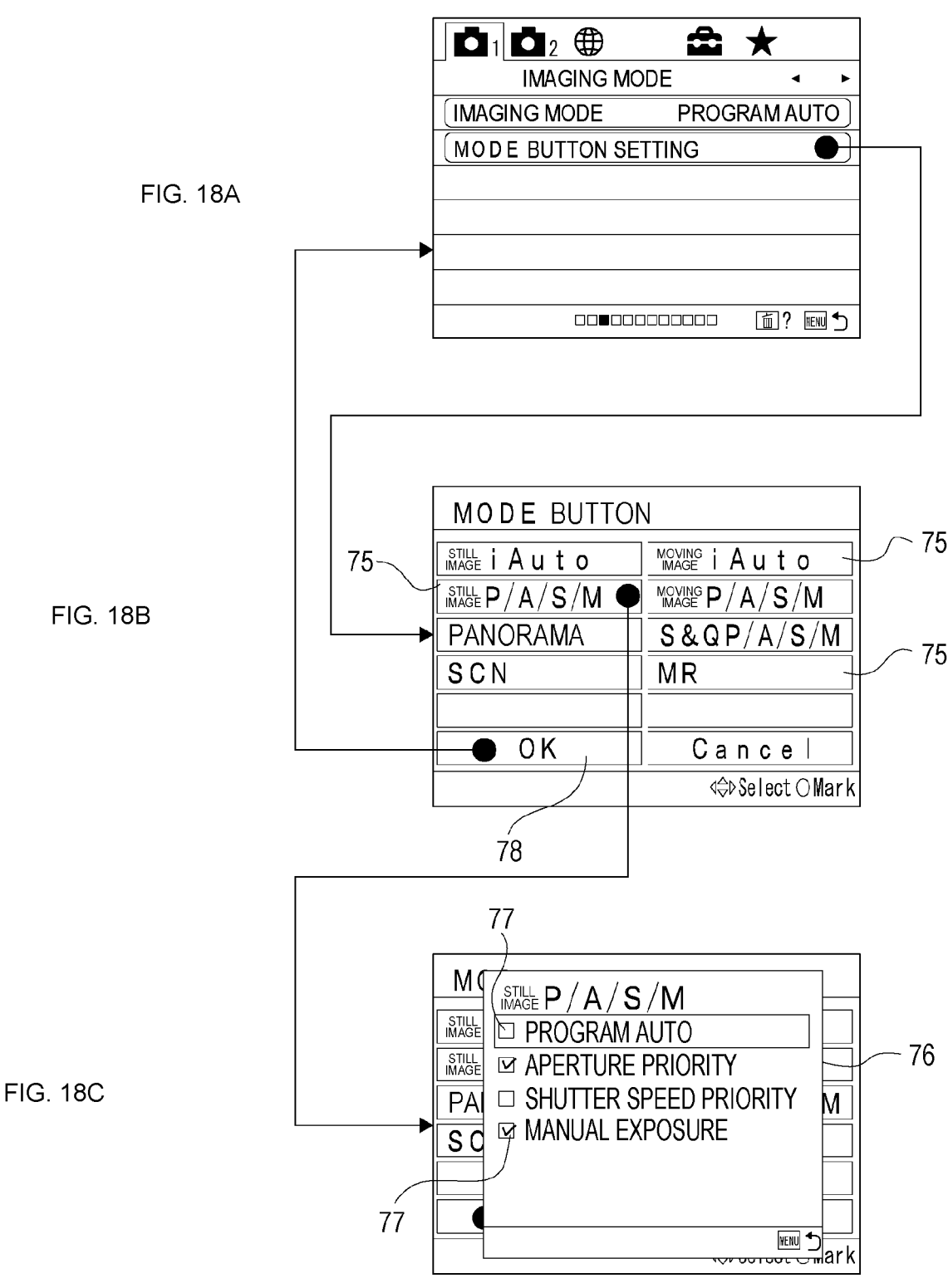
FIGS. 18A, 18B, and 18C are explanatory diagrams of a display example regarding selection of an imaging mode of the embodiment.

FIGS. 18A, 18B, and 18C illustrate a screen display example for selecting an imaging mode to be switched.

FIG. 18A illustrates a menu screen. The menu screen of FIG. 18A is provided with a "MODE button setting" function as one of the setting items. The "MODE button setting" is a function for selecting an imaging mode to be assigned to the mode button 110M, that is, an imaging mode to be switched by the manipulation of the mode button 110M.

FIG. 18B illustrates a category list screen which is a transition destination screen in a case where "MODE button setting" is selected on the menu screen of FIG. 18A. A category button 75 corresponding to each of eight mode categories is displayed on the category list screen. For example, the category button 75 of "still P/A/S/M" corresponds to the mode category of "still image PASM".

FIG. 18C illustrates a screen display example in a case where the category button 75 of "still P/A/S/M" is manipulated on the category list screen of FIG. 18B. In a case where the category button 75 is manipulated on the category list screen, a mode selection screen 76 of the corresponding mode category is displayed. On the mode selection screen 76, a setting mode that can be set in the selected mode category and a check box 77 for selecting the setting mode are displayed. FIG. 18C illustrates a state in which the imaging modes of the "still image mode with aperture priority" and the "still image mode with manual exposure" are selected by manipulating the check boxes 77 and 77 corresponding to the setting modes of "aperture priority" and "manual exposure".

After the user selects the imaging mode on the mode selection screen 76, the user returns to the category list screen, and can further select the imaging mode from other mode categories.

After the user selects all the imaging modes to be assigned to the mode button 110M, the user manipulates an OK button 78 on the category list screen of FIG. 18B to end the selection of the imaging mode. In a case where the OK button 78 is manipulated, screen transition is performed from the category list screen to the menu screen, and the selected imaging mode is assigned to the mode button 110M as the imaging mode to be switched by the manipulation of the mode button 110M.

Therefore, for example, in a case where the user selects 10 types of imaging modes from among 28 types of imaging modes using the check boxes 77, the mode button 110M is a manipulation element for switching each mode by a 10-stage toggle manipulation.

Note that the plurality of imaging modes selected by the user is switched in a toggle manner in an arrangement order of the imaging modes illustrated in FIG. 17. The arrangement order of the imaging modes in FIG. 17 is, for example, the same as the arrangement order of the check boxes 77 presented to the user on the category list screen and the mode selection screen 76 of FIGS. 18A, 18B, and 18C. Therefore, the user can easily grasp the switching order of the selected imaging modes.

Note that, in a case where a dial button for switching the setting mode is provided in the imaging device, the arrangement order of the imaging modes that can be switched may be the same as the arrangement order of the various setting modes in the dial button.

Note that, although an example in which the function of switching the imaging mode is assigned to the mode button 110M has been described above, it is also conceivable to assign a function of switching a mode other than the imaging mode, to the mode button 110M.

For example, different angle-of-view modes (for example, a "wide angle" mode and a "narrow angle" mode) may be switched by the manipulation of the mode button 110M. Furthermore, modes of a specific setting (for example, a setting mode of "ON" and a setting mode of "OFF" of the "product review setting" described above) may be switched.

5. Processing Example

A processing example in which the camera control unit 18 executes switching processing as the switching function of "ON" and "OFF" of the product review setting, the depth switching function, and the imaging mode switching function described above will be described with reference to FIG. 19.

Figure 19:
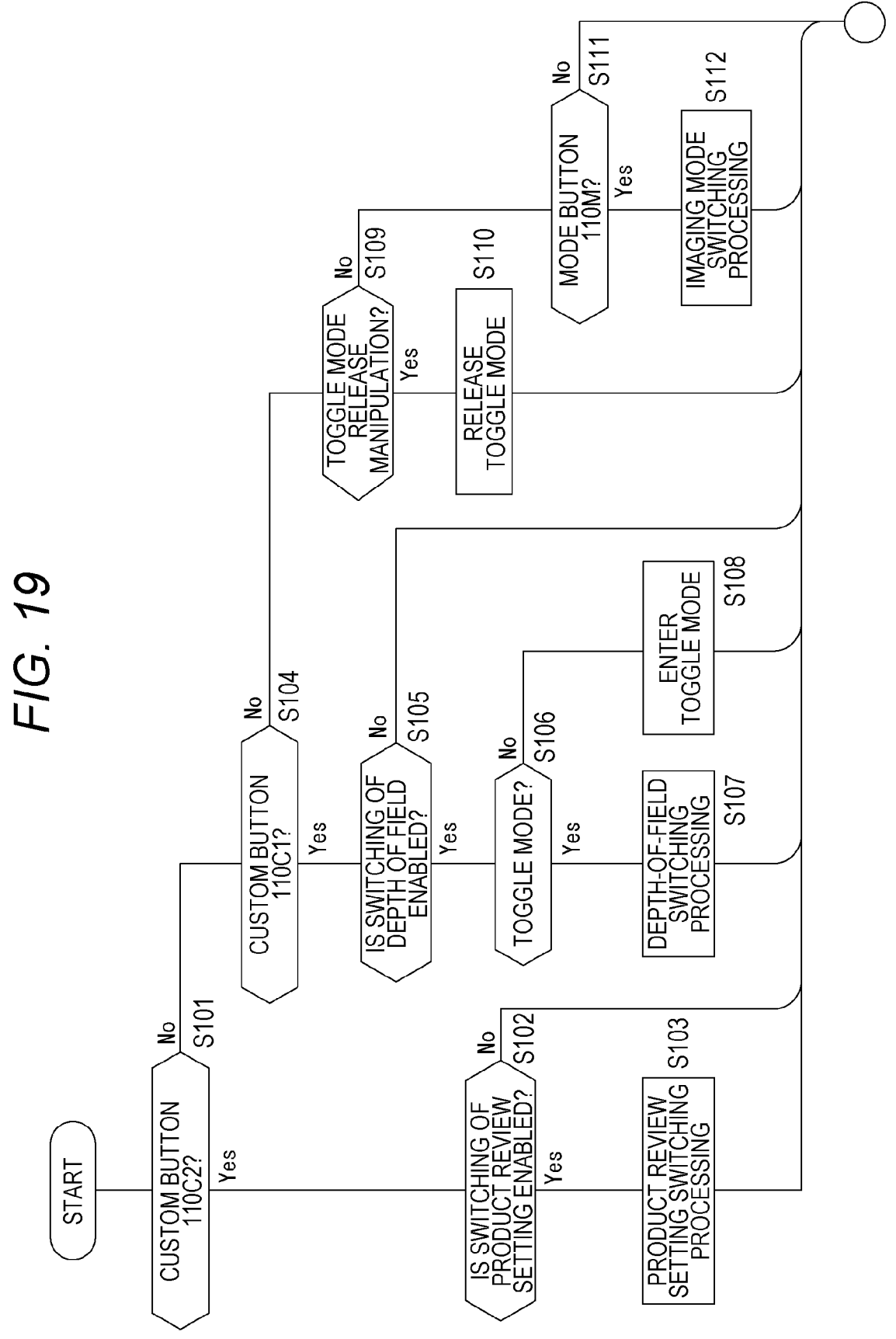
FIG. 19 is a flowchart of switching processing of the embodiment.

The processing example of FIG. 19 is a processing example in a case where the switching function of "ON" and "OFF" of the product review setting is assigned to the custom button 110C2, the depth switching function is assigned to the custom button 110C1, and the imaging mode switching function is assigned to the mode button 110M of the imaging device 1. Furthermore, it is assumed that a function of releasing the toggle mode of depth switching is assigned to the power-off manipulation and the menu button.

The camera control unit 18 monitors the manipulation regarding the switching in steps S101, S104, S109, and S111.

In step S101, the camera control unit 18 monitors the manipulation of the custom button 110C2. That is, a manipulation of giving an instruction for switching between "ON" and "OFF" of the product review setting is monitored.

In a case where it is detected in step S101 that the custom button 110C2 is manipulated, the camera control unit 18 proceeds from step S101 to step S102, and determines whether or not switching of the product review setting is enabled.

As described above, there is a case where switching from "OFF" to "ON" of the product review setting is disablement. Therefore, the camera control unit 18 checks the "ON" and "OFF" states of the current product review setting, and determines whether or not the switching (that is, switching from "OFF" to "ON") of the product review setting in the current setting mode is enabled in a case where the current product review setting is "OFF". Note that, in a case where the current product review setting is "ON", it is determined that the switching of the product review setting is enabled.

In a case where it is determined in step S102 that the switching of the product review setting is enabled, the camera control unit 18 proceeds from step S102 to step S103, and executes the product review setting switching processing.

That is, the camera control unit 18 changes the setting values of "face priority at the time of AF" and "moving image camera shake correction" according to the checked "ON" and "OFF" states of the current product review setting. Specifically, in a case where the product review setting is switched from "OFF" to "ON", the camera control unit 18 changes the setting values of "face priority at the time of AF" and "moving image camera shake correction" from "ON" to "OFF". Furthermore, in a case where the product review setting is switched from "ON" to "OFF", the camera control unit 18 changes the setting values of "face priority at the time of AF" and "moving image camera shake correction" from "OFF" to "ON".

Furthermore, the camera control unit 18 performs various types of display control according to the switching of "ON" and "OFF" of the product review setting. For example, the camera control unit 18 performs display control for executing the icon display described with reference to FIG. 5B and the caution output of the setting value change described with reference to FIGS. 6A and 6B.

In a case where the processing of step S103 is ended, the camera control unit 18 ends the processing illustrated in FIG. 19.

In a case where it is determined in step S102 that the switching to the product review setting is not enabled, the camera control unit 18 ends the processing illustrated in FIG. 19 without switching the product review setting. Note that, although illustration is omitted, in this case, the camera control unit 18 may perform display control for the caution output providing notification that the switching to the product review setting is not enabled.

In step S104, the camera control unit 18 monitors the manipulation of the custom button 110C1. That is, a manipulation of giving an instruction on switching of the depth of field (switching of "blur" and "sharpen" of the background) is monitored.

In a case where it is detected in step S104 that the custom button 110C1 is manipulated, the camera control unit 18 proceeds from step S104 to step S105, and determines whether or not switching of the depth of field is enabled.

As described above, there is a case where entering the toggle mode of switching of the depth or switching in the toggle mode is disabled. Therefore, the camera control unit 18 checks the current setting mode, and determines whether or not the processing for switching the depth of field described above is enabled in the current setting mode.

In a case where it is determined that the switching of the depth of field is not enabled, the camera control unit 18 ends the processing illustrated in FIG. 19.

In a case where it is determined that the switching of the depth of field is enabled, the camera control unit 18 proceeds from step S105 to step S106, and checks whether or not the switching of "blur" and "sharpen" by the toggle mode is enabled.

In a case where it is determined in step S106 that the switching by the toggle mode is enabled, the camera control unit 18 proceeds from step S106 to step S107, and performs the depth-of-field switching processing. That is, the camera control unit 18 refers to, for example, the memory unit 19 to check the value of the predetermined F-number set for each value of "blur" and "sharpen", changes the value to the first predetermined F-number of "sharpen" in a case where the current F-number is the second predetermined F-number of "blur", and changes the value to the second predetermined F-number of "blur" in a case where the current F-number is the first predetermined F-number of "sharpen".

Furthermore, the camera control unit 18 performs various types of display control according to the switching of the depth of field. For example, the control for icon display described with reference to FIGS. 9A, 9B, and 9C are performed.

In a case where the processing of step S107 is ended, the camera control unit 18 ends the processing illustrated in FIG. 19.

In a case where it is determined in step S106 that the switching by the toggle mode is not enabled, the camera control unit 18 proceeds from step S106 to step S108, and enables the switching of "blur" and "sharpen" by the toggle mode. That is, the toggle mode is entered.

Furthermore, the camera control unit 18 performs control so that the background transitions to a "blur" state after entering the toggle mode. That is, the F-number is changed to the second predetermined F-number set for "blur".

Note that, in a case of the blur state in which the depth of field is shallow (for example, the F-number is smaller than a specific value) before entering the toggle mode, it is considered that the F-number is not changed to the second predetermined F-number. However, in a case where the F-number is different from the second predetermined F-number even when the F-number is smaller than the specific value, the F-number may be changed to the second predetermined F-number.

Furthermore, in a case of the blur state in which the depth of field is shallow (for example, the current F-number is smaller than the specific value) before entering the toggle mode, control may be performed so that the state transitions to the "sharpen" state. That is, the F-number may be changed to the first predetermined F-number of "sharpen".

Furthermore, the camera control unit 18 performs various types of display control according to the depth of field set after entering the toggle mode. For example, the control for the caution output described with reference to FIG. 9C is performed.

In a case where the processing of step S108 is ended, the camera control unit 18 ends the processing illustrated in FIG. 19.

In step S109, the camera control unit 18 waits for a toggle mode release manipulation for depth switching. Specifically, a power-off manipulation and a manipulation using the menu button are monitored.

In a case where the toggle mode release manipulation is detected in step S109, the camera control unit 18 proceeds from step S109 to step S110, and releases the toggle mode for depth switching. Furthermore, the camera control unit 18 returns the F-number to the value before the toggle mode transition.

Furthermore, the camera control unit 18 may perform display control such as providing notification that the toggle mode is released, according to the release of the toggle mode.

In a case where the processing of step S110 is ended, the camera control unit 18 ends the processing illustrated in FIG. 19.

In step S111, the camera control unit 18 monitors the manipulation of the mode button 110M. That is, a manipulation of giving an instruction on the switching of the imaging mode is monitored.

In a case where it is detected in step S111 that the mode button 110M is manipulated, the camera control unit 18 proceeds from step S111 to step S112, and performs imaging mode switching processing. That is, the camera control unit 18 checks the current imaging mode, refers to, for example, the memory unit 19 to check the imaging mode next to the current imaging mode and the setting in the next imaging mode, and then applies the setting of the next imaging mode and the setting mode.

Furthermore, the camera control unit 18 executes various types of display control according to the switching of the imaging mode. For example, the control for icon display and display transition described with reference to FIGS. 11A, 11B, 11C, 12A, 12B, 13A, 13B, and 13C are performed.

In a case where the processing of step S112 is ended, the camera control unit 18 ends the processing illustrated in FIG. 19.

The above processing illustrated in FIG. 19 is periodically executed by the camera control unit 18, so that various types of switching according to the manipulation are realized.

Note that, in the above description, the processing example in a case where the imaging device 1 has the function of switching "ON" and "OFF" of the product review setting, the depth switching function, and the imaging mode switching function has been described. However, the imaging device 1 may have only some of the functions described above. In a case where the imaging device 1 has only some of the functions, only processing for realizing some functions of the imaging device 1 is performed among the processing illustrated in FIG. 19.

Furthermore, the assignment of each function to the manipulation element described above is an example, and each function may be assigned to another manipulation element or manipulation means of the imaging device 1.

6. Summary and Modification Example

Although the embodiments have been described above, it is possible to provide an imaging device suitable for applications such as a moving image poster and a video blogger particularly by the functions.

In the imaging device 1 of the embodiment, the camera control unit 18 performs first switching processing of switching between a first setting used for imaging in a moving state, for example, imaging while a person is walking while holding the imaging device by a hand, and a second setting used for imaging in a non-moving state, for example, imaging while being placed on a desk or the like.

That is, it is processing of switching between "ON" and "OFF" of the product review setting. Therefore, it is possible to easily change the setting to a state suitable for each of "imaging while walking" and "imaging while standing", which are representative as the imaging of the moving image poster, and thereby usability is improved.

In particular, since this function can be easily used by pressing a button such as the custom button 110C2 once, manipulability of imaging at the time of the product review or the like is greatly improved.

In particular, the first setting (the product review setting is "OFF") is a setting that enables the setting of the priority target at the time of autofocus and turns on the camera shake correction, and the second setting (the product review setting is "ON") is a setting that disables the setting of the priority target at the time of autofocus and turns off the camera shake correction. This is a setting suitable for a situation in which the subject easily fluctuates and camera shake occurs in the imaging while walking, and in the imaging while standing, priority setting is not unnecessarily performed, and unnecessary shake correction is not performed.

Furthermore, turning off the camera shake correction is also for the angle of view. In a case where the camera shake correction is turned on, the angle of view is narrowed. Therefore, in order to secure the angle of view and eliminate the fluctuation as much as possible, it is effective to turn off the camera shake correction in the second setting (the product review setting is "ON").

Furthermore, by switching between "ON" and "OFF" of the product review setting as the first switching processing in a toggle manner, the user can immediately switch to an appropriate setting state.

Furthermore, according to "ON" and "OFF" of the product review setting as the first switching processing, the display (refer to FIG. 5B) presented by the setting is performed, and thereby the user can easily recognize the setting.

Furthermore, in the second setting used for imaging in the non-moving state, the display (refer to FIG. 7A) for presenting a guide frame indicating a visual field range at the time of the moving image capturing is executed at the time of imaging standby for still image capturing, and thereby the user can recognize the visual field range at the time of the moving image capturing before the moving image capturing.

At the time of the imaging while standing, there is a case where the user first creates an image with a through-image of the still image capturing and then switches to the moving image capturing mode to perform imaging, but the angle of view at the time of the moving image capturing is narrower than the angle of view at the time of the still image capturing. Therefore, by presenting the guide frame indicating the visual field range at the time of the moving image capturing on the imaging standby screen of the still image capturing, the user can create an image in consideration of the visual field range at the time of the moving image capturing on the through-image of the still image capturing.

Furthermore, in the imaging device 1 of the embodiment, the camera control unit 18 performs second switching processing of alternately switching between a first predetermined F-number for increasing the depth of field and a second predetermined F-number for decreasing the depth of field with respect to the F-number.

Therefore, the user can instantaneously switch between two values of "blur (shallow depth of field)" and "sharpen (deep depth of field)", and image creation can be diversified.

Furthermore, in the imaging device 1 of the embodiment, the second predetermined F-number is a value corresponding to aperture opening. Therefore, instantaneous switching to the shallowest depth of field is realized.

Furthermore, by performing control to enter the toggle mode in which the first predetermined F-number and the second predetermined F-number are alternately switched as the second switching processing according to the specific manipulation, an easy switching manipulation for the user can be provided.

In particular, the background blur switching is performed such that the background is switched between "blur" and "sharpen" by a one-touch operation (one push) of the manipulation element such as the custom button 110C1, so that various type of image creation can be executed very easily.

Furthermore, the user easily recognizes the state by the display presenting that the F-number is the first predetermined F-number or the second predetermined F-number (refer to FIG. 9B).

In the imaging device 1 of the embodiment, the recording button 110R, which is a manipulation element for the moving image capturing, is provided on the upper surface of the main body housing 100, and the recording button 110R has a larger manipulation surface size than other manipulation elements except the shutter button 110S, which are arranged on the upper surface.

Therefore, it is possible to improve the manipulability of the recording start at the time of the imaging while standing. In particular, in a case where the moving image poster takes a selfie, the recording button 110R is extremely easy to use.

In the imaging device 1 of the embodiment, the camera control unit 18 performs third switching processing of switching a plurality of imaging modes including variable speed moving image recording.

Therefore, it is possible to realize switching of a plurality of imaging modes including an imaging mode (for example, S&Q mode) in which the variable speed moving image recording is performed. For example, it is possible to provide a switching function of two stages of a moving image capturing mode (moving image mode) of 1× speed and an imaging mode (S&Q mode of "2× slow") in which variable speed moving image recording is performed twice slower than the moving image mode.

By enabling switching to a plurality of imaging modes including such variable speed moving image recording, video representation in the moving image capturing using the imaging device 1 can be diversified. Therefore, it is possible to provide a particularly suitable function for a moving image poster who is particular about video expression.

In the imaging device 1 of the embodiment, the plurality of imaging modes in the third switching processing includes a still image capturing mode (still image mode), a first moving image capturing mode (moving image mode), and a second moving image capturing mode (S&Q mode), the frame rate of the first moving image capturing mode is a reference frame rate, and the frame rate of the second moving image capturing mode is different from the reference frame rate.

Therefore, for example, it is possible to realize switching in three stages of the "still image mode", the "moving image mode", and the "S&Q mode".

The switching of three stages described above is particularly suitable, for example, for a moving image poster who wants to acquire a still image or a slow motion moving image (or a quick motion moving image) from time to time while mainly performing normal moving image capturing in the moving image mode. This is because it is possible to quickly switch to an imaging mode to be used by narrowing the number of stages of switchable imaging modes while securing the possibility of various video expressions by a plurality of imaging modes.

In the imaging device 1 of the embodiment, the reference frame rate is a frame rate for 1× speed moving image recording, and the frame rate of the second moving image capturing mode ("S&Q mode") can be set to a value higher or lower than the reference frame rate.

Therefore, as the "S&Q mode", slow motion or quick motion imaging can be performed as compared with the 1× speed moving image capturing by the "moving image mode". Which one of slow motion imaging and quick motion imaging is frequently used depends on a moving image poster or an imaging situation. Therefore, by performing setting so that any imaging can be realized as the "S&Q mode", it is possible to provide an imaging mode adapted to the preferences and imaging situations of various moving image posters.

In the imaging device 1 of the embodiment, as the third switching processing, processing of switching a plurality of imaging modes in a toggle manner is performed according to the manipulation.

Therefore, since the imaging modes are repeatedly switched in a predetermined order according to the manipulation, switching can be realized in a mode easy for the user to understand. In particular, in a case where there are several types (for example, three stages) of imaging modes to be switched, it is possible to quickly switch to a desired imaging mode with a simple manipulation.

Note that, in the embodiment, an example has been described in which switching of the imaging mode using the mode button 110M does not allow skipping or returning in the reverse direction. However, for example, it is also conceivable to assign a function of skipping the order or a function of returning in the reverse direction to another button of the imaging device 1 and add these functions.

In the imaging device 1 of the embodiment, a manipulation element (mode button 110M) for giving an instruction on the third switching processing is provided on the upper surface of the main body housing.

Therefore, the imaging mode can be immediately switched by the manipulation of the mode button 110M. For example, it is difficult to perform a dial manipulation or a setting manipulation on the menu screen in a posture in which the imaging device 1 is held toward the user himself/herself for a selfie. Therefore, by providing the mode button 110M as the dedicated manipulation element, the manipulability of switching is improved. Further, by providing the mode button 110M on the upper surface side of the imaging device 1, the manipulation can be easily performed even in a posture for a selfie.

Note that, in the embodiment, an example has been described in which the imaging mode is switched by the mode button 110M and the setting mode is set from the dedicated setting screen. However, a lever dedicated to switching the imaging mode may be prepared instead of the mode button 110M, and a dial for selecting the setting mode may be prepared instead of the setting screen. Also by providing such a lever as a dedicated manipulation element, the manipulability can be improved.

The combination of the means for switching the imaging mode and the means for selecting the setting mode, and the specific method for providing the combination are not limited to the examples described above, and various methods can be considered. For example, the mode button 110M may be provided as the means for switching the imaging mode, the dial may be provided as the means for selecting the setting mode, the lever may be provided as the means for switching the imaging mode, and the setting screen may be provided as the means for selecting the setting mode.

Furthermore, switching of the imaging mode may be performed by a touch manipulation on the display panel 101. For example, it is conceivable to switch to "slow" by drawing a circle clockwise once, "2× slow" by drawing a circle clockwise twice, "quick" by drawing a circle counterclockwise once, and "2× quick" by drawing a circle counterclockwise twice. In particular, in a case where the display panel 101 can be directed to the photographer himself/herself in the posture for a selfie, it is possible to easily and intuitively realize easy switching by such a touch manipulation.

Furthermore, switching of the imaging mode by a gesture manipulation may be enabled. For example, it is conceivable to switch to "slow" by rotating the hand clockwise once, to "2× slow" by rotating the hand clockwise twice, to "quick" by rotating the hand counterclockwise once, and to "2× quick" by rotating the hand counterclockwise twice. Also in this case, it is possible to easily and intuitively realize easy switching. For example, even in a case where the moving image photographer places the imaging device at a distant position and performs a selfie, switching can be performed.

In addition, it may be possible to switch the imaging mode by voice recognition.

In the imaging device 1 of the embodiment, the camera control unit 18 performs control processing of executing display presenting the imaging mode after completion of the switching before completion of the switching according to the manipulation, according to the manipulation of giving an instruction on the third switching processing (refer to FIGS. 13A, 13B, and 13C).

That is, the mode notification icon 70 is displayed according to the manipulation of giving an instruction on switching. Therefore, the user can easily grasp the imaging mode after switching. In particular, it is possible to realize presentation that is easy for the user to visually recognize even in a scene where the user himself/herself performs imaging while moving or a scene where the user holds the imaging device 1 toward himself/herself in a posture for a selfie.

Note that, in the embodiment, an example has been described in which the mode notification icon 70 is continuously displayed even after completion of switching of the imaging mode (refer to FIG. 13B), but the display of the mode notification icon 70 may be ended without waiting for the completion of switching of the imaging mode. Furthermore, the display of the mode notification icon 70 may be ended simultaneously with the completion of switching of the imaging mode.

A program of the embodiment causes an arithmetic processing device to realize a function of switching between a first setting used for imaging in a moving state and a second setting used for imaging in a non-moving state, and a function of alternately switching between a first predetermined F-number for increasing the depth of field and a second predetermined F-number for decreasing the depth of field with respect to the F-number.

The arithmetic processing device is, for example, an arithmetic processing device (microchip) as the camera control unit 18. With such a program, it is possible to widely realize the provision of the imaging device 1 described above. For example, it is assumed that the program is provided as an update program of the imaging device 1.

These programs can be recorded in advance in an HDD as a storage medium built in a device such as a computer device, a ROM in a microcomputer having a CPU, or the like.

Furthermore, the program can be temporarily or permanently stored (recorded) in a removable storage medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable storage medium can be provided as so-called package software.

Furthermore, such a program can be installed from a removable storage medium to a personal computer or the like, or can be downloaded from a download site via a network such as a local area network (LAN) or the Internet.

Furthermore, such a program is suitable for providing the imaging device 1 of the embodiment in a wide range. For example, by downloading the program to a portable terminal device such as a smartphone or a tablet, a mobile phone, a personal computer, a game device, a video device, a personal digital assistant (PDA), or the like having an imaging function, the smartphone or the like can be caused to function as the imaging device 1 of the present disclosure.

Note that the present technology is not limited to the embodiments, and various modification examples are assumed.

For example, it is also conceivable to provide an on-screen display (OSD) display customized to a state suitable for a moving image poster or the like.

For example, a display mode is prepared so that the icon group displayed on the imaging standby screen can be customized and provided for the moving image poster. For example, as the OSD display, a display mode including icons for setting the above-described scene [town walk]/[imaging while standing] and depth mode [blur]/[sharpen] is prepared while maintaining existing icons, and the user can arbitrarily select the normal OSD display and the OSD display for the moving image poster.

Note that, the effects described in the specification are merely examples and are not limited, and may have other effects.

Note that the present technology can also adopt the following configurations.

(1)

An imaging device including:

a control unit that performs first switching processing of switching between a first setting used for imaging in a moving state and a second setting used for imaging in a non-moving state, and second switching processing of alternately switching between a first predetermined F-number for increasing a depth of field and a second predetermined F-number for decreasing the depth of field with respect to an F-number.

(2)

The imaging device described in (1), in which the first setting is a setting that enables a setting of a priority target at a time of autofocus, and turns on camera shake correction, and the second setting is a setting that disables the setting of the priority target at the time of autofocus, and turns off the camera shake correction.

(3)

The imaging device described in (1) or (2), in which the control unit performs processing of switching between the first setting and the second setting in a toggle manner according to a manipulation, as the first switching processing.

(4)

The imaging device described in any one of (1) to (3), in which the control unit performs control processing of executing display presenting that the setting is the first setting or the second setting according to the first switching processing.

(5)

The imaging device described in any one of (1) to (4), in which the control unit performs control processing of executing display presenting a guide frame indicating a visual field range at a time of moving image capturing, at a time of imaging standby for still image capturing in the second setting.

(6)

The imaging device described in any one of (1) to (5), in which the first predetermined F-number is a value corresponding to aperture opening.

(7)

The imaging device described in any one of (1) to (6), in which the control unit performs control to enter a toggle mode in which the first predetermined F-number and the second predetermined F-number are alternately switched as the second switching processing according to a specific manipulation.

(8)

The imaging device described in any one of (1) to (7), in which the control unit performs control processing of executing display presenting that the F-number is the first predetermined F-number or the second predetermined F-number.

(9)

The imaging device described in any one of (1) to (8), in which a manipulation element for moving image capturing is provided on an upper surface of a main body housing, and the manipulation element has a larger manipulation surface size than other manipulation elements except a shutter manipulation element, which are arranged on the upper surface.

(10)

The imaging device described in any one of (1) to (9), in which the control unit performs third switching processing of switching a plurality of imaging modes including variable speed moving image recording.

(11)

The imaging device described in (10), in which the plurality of imaging modes includes a still image capturing mode, a first moving image capturing mode, and a second moving image capturing mode, a frame rate of the first moving image capturing mode is a reference frame rate, and a frame rate of the second moving image capturing mode is different from the reference frame rate.

(12)

The imaging device described in (11), in which the reference frame rate is a frame rate for 1× speed moving image recording, and the frame rate of the second moving image capturing mode is able to be set to be higher or lower than the reference frame rate.

(13)

The imaging device described in any one of (10) to (12), in which the control unit performs processing of switching the plurality of imaging modes in a toggle manner according to a manipulation, as the third switching processing.

(14)

The imaging device described in any one of (10) to (13), in which a manipulation element for giving an instruction on the third switching processing is provided on an upper surface of the main body housing.

(15)

The imaging device described in any one of (10) to (14), in which, before completion of switching according to a manipulation of giving an instruction on the third switching processing, the control unit performs control processing of executing display presenting the imaging mode in which imaging is enabled after completion of the switching according to the manipulation.

(16)

An imaging control device including:

a control unit that performs first switching processing of switching between a first setting used for imaging in a moving state and a second setting used for imaging in a non-moving state, and second switching processing of alternately switching between a first predetermined F-number for increasing a depth of field and a second predetermined F-number for decreasing the depth of field with respect to an F-number.

(17)

A control method of an imaging device, the control method including:

a procedure of switching between a first setting used for imaging in a moving state and a second setting used for imaging in a non-moving state; and a procedure of alternately switching between a first predetermined F-number for increasing a depth of field and a second predetermined F-number for decreasing the depth of field with respect to an F-number.

(18)

A program causing an arithmetic processing device to realize:

a function of switching between a first setting used for imaging in a moving state and a second setting used for imaging in a non-moving state; and a function of alternately switching between a first predetermined F-number for increasing a depth of field and a second predetermined F-number for decreasing the depth of field with respect to an F-number.

(19)

An imaging device including:

a control unit that performs switching processing of switching between a first setting used for imaging in a moving state and a second setting used for imaging in a non-moving state.

(20)

An imaging device including:

a control unit that performs switching processing of alternately switching between a first predetermined F-number for increasing a depth of field and a second predetermined F-number for decreasing the depth of field with respect to an F-number.

(21)

An imaging device including:

a control unit that performs switching processing of switching a plurality of imaging modes including variable speed moving image recording.

REFERENCE SIGNS LIST

1 Imaging device
13 Camera signal processing unit
14 Recording control unit 15 Display unit
16 Communication unit
17 Manipulation unit
18 Camera control unit
50 Function menu
51, 52 Focus frame
53, 54 Assignment presentation icon
55 Product review setting icon
56, 57, 59 Caution notification
58, 58A, 58B Icon
60 Guide frame
61 Camera shake correction icon
62 AF icon
63, 63A, 63B, 63C Mode icon
70 Mode notification icon
100 Main body housing
101 Display panel
102 Lens unit
110 Manipulation element
110R Recording button
110S Shutter button
110M Mode button
110C1 Custom button
110C2 Custom button

The invention claimed is:

1. An imaging device, comprising:
a first manipulation element on a surface of the imaging device;
a second manipulation element;
a third manipulation element associated with a moving image capturing operation of the imaging device, wherein
  a manipulation surface size of the third manipulation element is larger than a manipulation surface size of the second manipulation element, and
  each of the first manipulation element, the second manipulation element, and the third manipulation element is different; and
a central processing unit (CPU) configured to:
  perform, based on a manipulation of the first manipulation element, a first switching operation to switch between a first setting and a second setting, wherein
    the first setting is associated with a first imaging operation of the imaging device in a moving state of the imaging device, and
    the second setting is associated with a second imaging operation of the imaging device in a non-moving state of the imaging device;
  perform a second switching operation to alternately switch between a first F-number and a second F-number, wherein
    the first F-number is associated with an increase in a depth of field, and
    the second F-number is associated with a decrease in the depth of field;
  cancel the second switching operation based on a F-number change operation, wherein
    the F-number change operation is based on a manipulation of the second manipulation element; and
  revert one of the first F-number or the second F-number to a third F-number, wherein the third F-number is associated with a time period before the second switching operation.

2. The imaging device according to claim 1, wherein
  the first setting enables a setting of a priority target at a time of autofocus and turns on a camera shake correction, and
  the second setting disables the setting of the priority target at the time of autofocus and turns off the camera shake correction.
3. The imaging device according to claim 1, wherein the CPU is further configured to control, based on the first switching operation, display of information that indicates one of the first setting or the second setting.
4. The imaging device according to claim 1, wherein
  the CPU is further configured to control, based on the second setting, display of a guide frame at a time of imaging standby for a still image capturing operation of the imaging device, and
  the guide frame indicates a visual field range at a time of a moving image capturing operation of the imaging device.
5. The imaging device according to claim 1, further comprising an aperture, wherein the second F-number is a value that corresponds to an aperture opening of the aperture.
6. The imaging device according to claim 1, wherein the CPU is further configured to enter, based on a manipulation of the second manipulation element, a toggle mode in which the first F-number and the second F-number are alternately switched as the second switching operation.
7. The imaging device according to claim 1, wherein the CPU is further configured to control display of information that indicates one of the first F-number or the second F-number.
8. The imaging device according to claim 1, further comprising:
a main body housing; and
a plurality of manipulation elements, wherein
  the plurality of manipulation elements includes the first manipulation element, the second manipulation element, the third manipulation element, and a shutter manipulation element,
  the second manipulation element, the third manipulation element, and the shutter manipulation element are on an upper surface of the main body housing, and
  the manipulation surface size of the third manipulation element is equal to or smaller than a manipulation surface size of the shutter manipulation element.
9. The imaging device according to claim 1, wherein the CPU is further configured to perform a third switching operation to switch between a plurality of imaging modes for a variable speed moving image recording operation of the imaging device.
10. The imaging device according to claim 9, wherein
  the plurality of imaging modes includes a still image capturing mode, a first moving image capturing mode, and a second moving image capturing mode,
  a frame rate of the first moving image capturing mode is a reference frame rate, and
  a frame rate of the second moving image capturing mode and the reference frame rate are different.
11. The imaging device according to claim 10, wherein
  the reference frame rate corresponds to a 1× speed moving image recording operation of the imaging device, and
  the frame rate of the second moving image capturing mode is one of a higher than the reference frame rate or lower than the reference frame rate.

12. The imaging device according to claim 9, wherein the CPU is further configured to perform, based on a manipulation of the first manipulation element, the third switching operation to switch between the plurality of imaging modes in a toggle manner.

13. The imaging device according to claim 12, further comprising a main body housing, wherein the first manipulation element is on an upper surface of the main body housing.

14. The imaging device according to claim 9, wherein the CPU is further configured to control, prior to completion of the third switching operation, display of information that indicates an imaging mode of the plurality of imaging modes that is switched to after the completion of the third switching operation.

15. An imaging control device, comprising:
a central processing unit (CPU) configured to:
    perform, based on a manipulation of a first manipulation element that is on a surface of an imaging device, a first switching operation to switch between a first setting and a second setting, wherein
        the first setting is associated with a first imaging operation of the imaging device in a moving state of the imaging device, and
        the second setting is associated with a second imaging operation of the imaging device in a non-moving state of the imaging device; and
    perform, based on a manipulation of a second manipulation element, a second switching operation to alternately switch between a first F-number and a second F-number, wherein
        the first F-number is associated with an increase in a depth of field, and
        the second F-number is associated with a decrease in the depth of field;
    perform a moving image capturing operation based on a manipulation of a third manipulation element, wherein
        a manipulation surface size of the third manipulation element is larger than a manipulation surface size of the second manipulation element, and
        each of the first manipulation element, the second manipulation element, and the third manipulation element is different;
    cancel the second switching operation based on an F-number change operation; and
    revert one of the first F-number or the second F-number to a third F-number, wherein the third F-number is associated with a time period before the second switching operation.

16. A control method of an imaging device, the control method comprising:
manipulating a first manipulation element that is on a surface of the imaging device;
performing a first switching operation between a first setting and a second setting based on the manipulation of the first manipulation element, wherein
    the first setting is for a first imaging operation of the imaging device in a moving state of the imaging device, and
    the second setting is for a second imaging operation of the imaging device in a non-moving state of the imaging device; and
manipulating a second manipulation element of the imaging device;
performing, based on the manipulation of the second manipulation element, a second switching operation to alternately switch between a first F-number for increasing a depth of field and a second F-number for decreasing the depth of field;
manipulating a third manipulation element of the imaging device; and
performing a moving image recording operation based on the manipulation of the third manipulation element, wherein
    a manipulation surface size of the third manipulation element is larger than a manipulation surface size of the second manipulation element, and
    each of the first manipulation element, the second manipulation element, and the third manipulation element is different;
canceling the second switching operation based on an F-number change operation; and
reverting one of the first F-number or the second F-number to a third F-number, wherein the third F-number is associated with a time period before the second switching operation.

17. A non-transitory computer-readable medium having stored thereon computer-executable instructions which, when executed by a computer, cause the computer to execute operations, the operations comprising:
manipulating a first manipulation element that is on a surface of an imaging device;
performing a first switching operation between a first setting and a second setting based on the manipulation of the first manipulation element, wherein
    the first setting is for a first imaging operation of the imaging device in a moving state of the imaging device, and
    the second setting is for a second imaging operation of the imaging device in a non-moving state of the imaging device; and
manipulating a second manipulation element of the imaging device;
performing, based on the manipulation of the second manipulation element, a second switching operation to alternately switch between a first F-number for increasing a depth of field and a second F-number for decreasing the depth of field;
manipulating a third manipulation element of the imaging device; and
performing a moving image capture operation based on the manipulation of the third manipulation element, wherein
    a manipulation surface size of the third manipulation element is larger than a manipulation surface size of the second manipulation element, and
    each of the first manipulation element, the second manipulation element, and the third manipulation element is different;
canceling the second switching operation based on an F-number change operation; and
reverting one of the first F-number or the second F-number to a third F-number, wherein the third F-number is associated with a time period before the second switching operation.

18. An imaging device, comprising:
a first manipulation element for a switching operation to alternately switch between a first F-number to increase a depth of field and a second F-number to decrease the depth of field;
a second manipulation element associated with a moving image capturing operation of the image device, wherein a manipulation surface size of the second manipulation element is larger than a manipulation surface size of the first manipulation element; and a central processing unit configured to: perform the switching operation based on a manipulation of the first manipulation element;

cancel the switching operation based on an F-number change operation, wherein the F-number change operation is based on a manipulation of the second manipulation element different from the first manipulation element; and revert one of the first F-number or the second F-number to a third F-number, wherein the third F-number is associated with a time period before the switching operation.

* * * * *